United States Patent [19]
Bishop

[11] 4,136,340
[45] Jan. 23, 1979

[54] SEQUENTIAL PROBABILITY RATIO TEST FOR FRIEND IDENTIFICATION SYSTEM

[75] Inventor: Walton B. Bishop, Oxon Hill, Md.

[73] Assignee: The United States of America as represented by the Secretary of the Navy, Washington, D.C.

[21] Appl. No.: 873,745

[22] Filed: Jan. 30, 1978

[51] Int. Cl.² ............................ G01S 9/02; G01S 9/56
[52] U.S. Cl. ............................ 343/5 DP; 343/5 VQ; 343/6.5 LC; 343/7.3
[58] Field of Search .......... 343/5 DP, 5 VQ, 6.5 LC, 343/7.3

[56] References Cited

U.S. PATENT DOCUMENTS

| | | | |
|---|---|---|---|
| 3,579,237 | 5/1971 | Steingart et al. | 343/5 VQ |
| 3,721,906 | 3/1973 | Geesen | 343/6.5 LC |
| 3,781,881 | 12/1973 | Hovey | 343/5 DP |
| 3,922,673 | 11/1975 | Bishop | 343/6.5 LC |
| 3,981,009 | 9/1976 | Bishop | 343/5 VQ |
| 4,025,919 | 5/1977 | Jefferies | 343/5 VQ |
| 4,048,636 | 9/1977 | Bishop | 343/5 VQ |

OTHER PUBLICATIONS

Bishop et al., NRL Report 7916, 8/19/75.

Primary Examiner—S. C. Buczinski
Attorney, Agent, or Firm—R. S. Sciascia; Philip Schneider; David G. Rasmussen

[57] ABSTRACT

The present invention involves apparatus for performing a sequential probability ratio test to make decisions in a Friend Identification System. The apparatus determines a product of sequential ratio probabilities and compares them to appropriate threshold probability values to make decisions as to acceptability, non-acceptability, or the unknown nature of replies from a target.

7 Claims, 22 Drawing Figures

SINGLE LOOK UNLIMITED REPLY SPRT DEVICE (SLUR-SPRT)

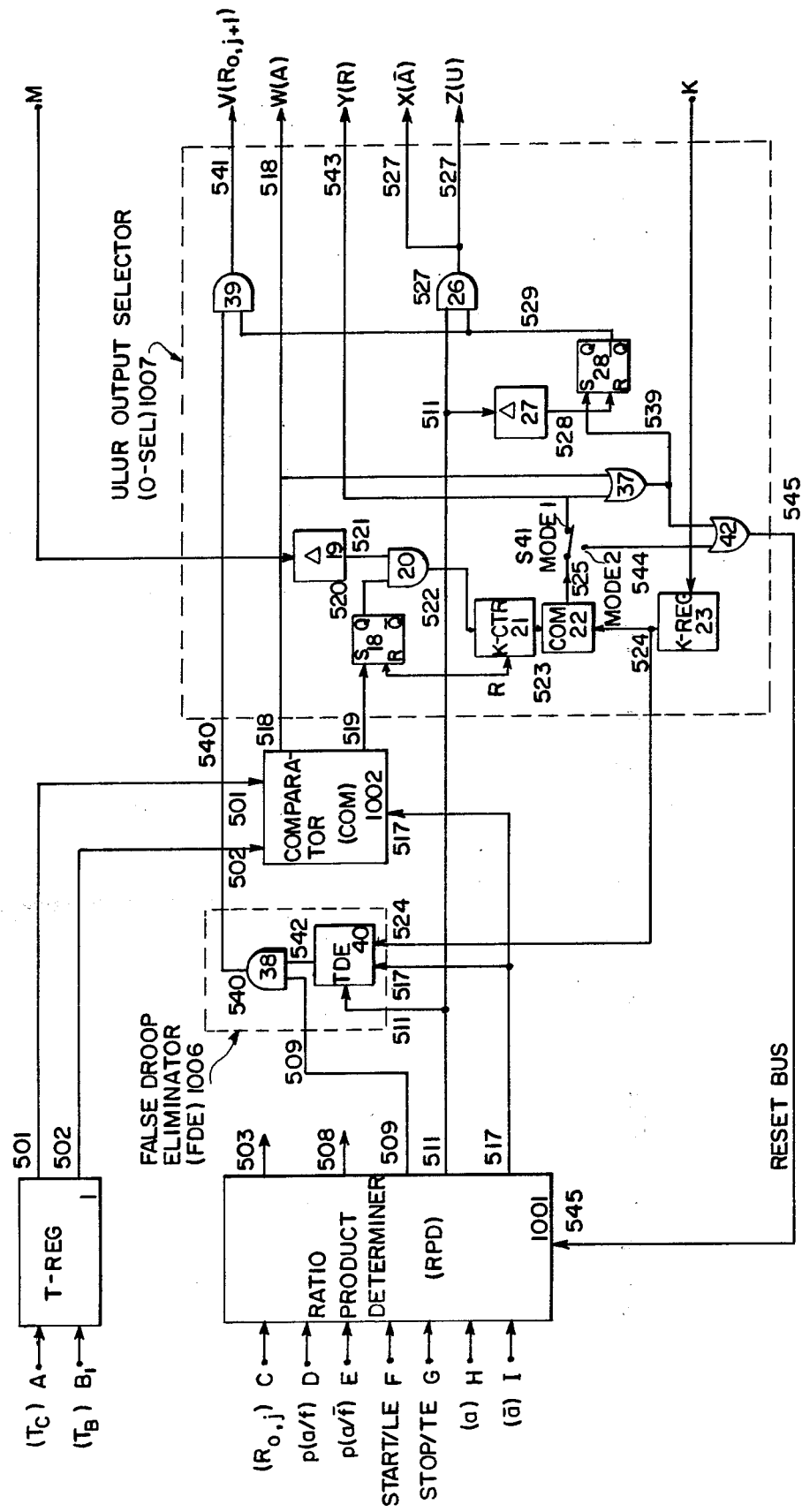
FIG. IC

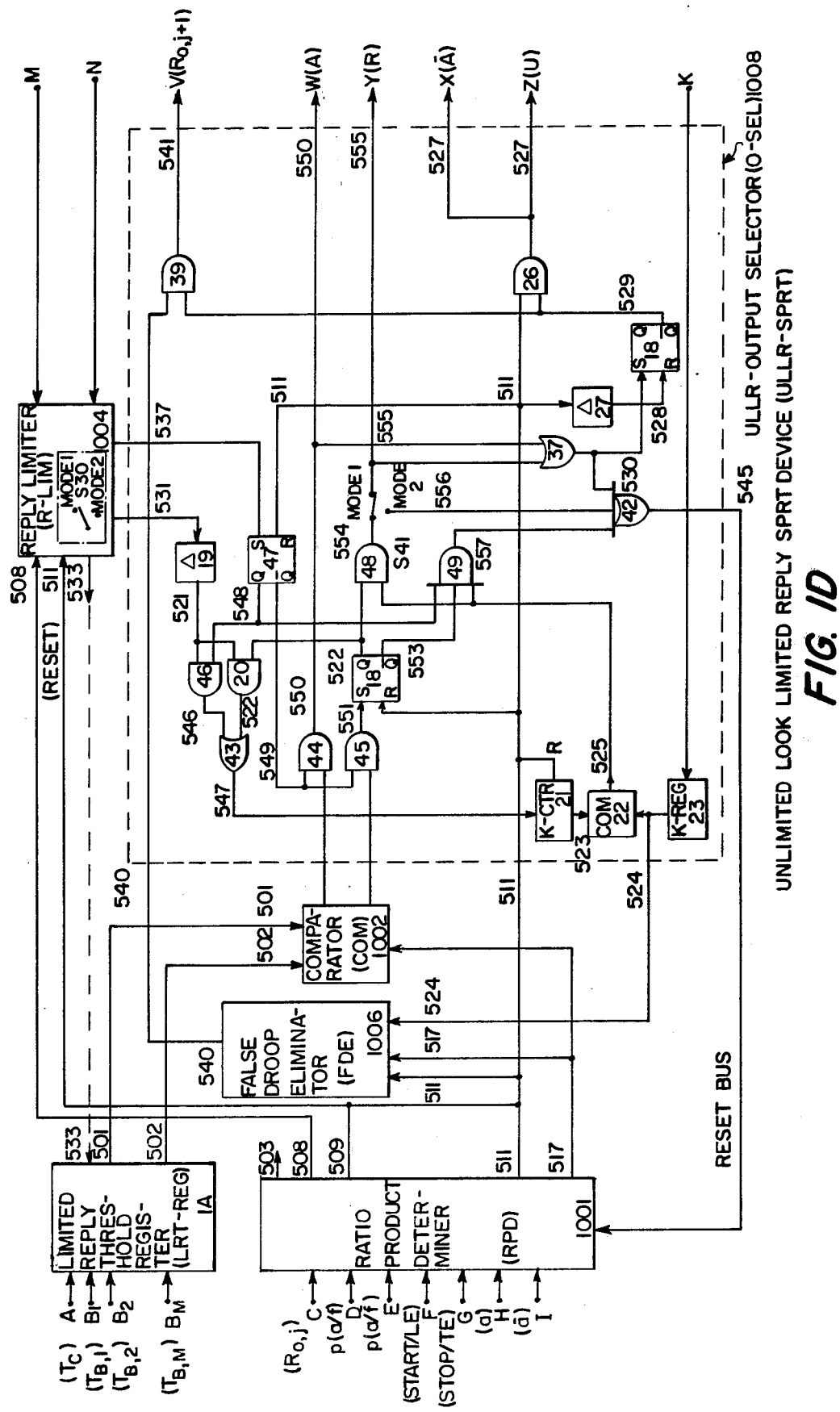
FIG. ID

LIMITED LOOK UNLIMITED REPLY SPRT DEVICE (LLUR-SPRT)

SIMPLIFIED BLOCK DIAGRAM OF SLUR-SPRT

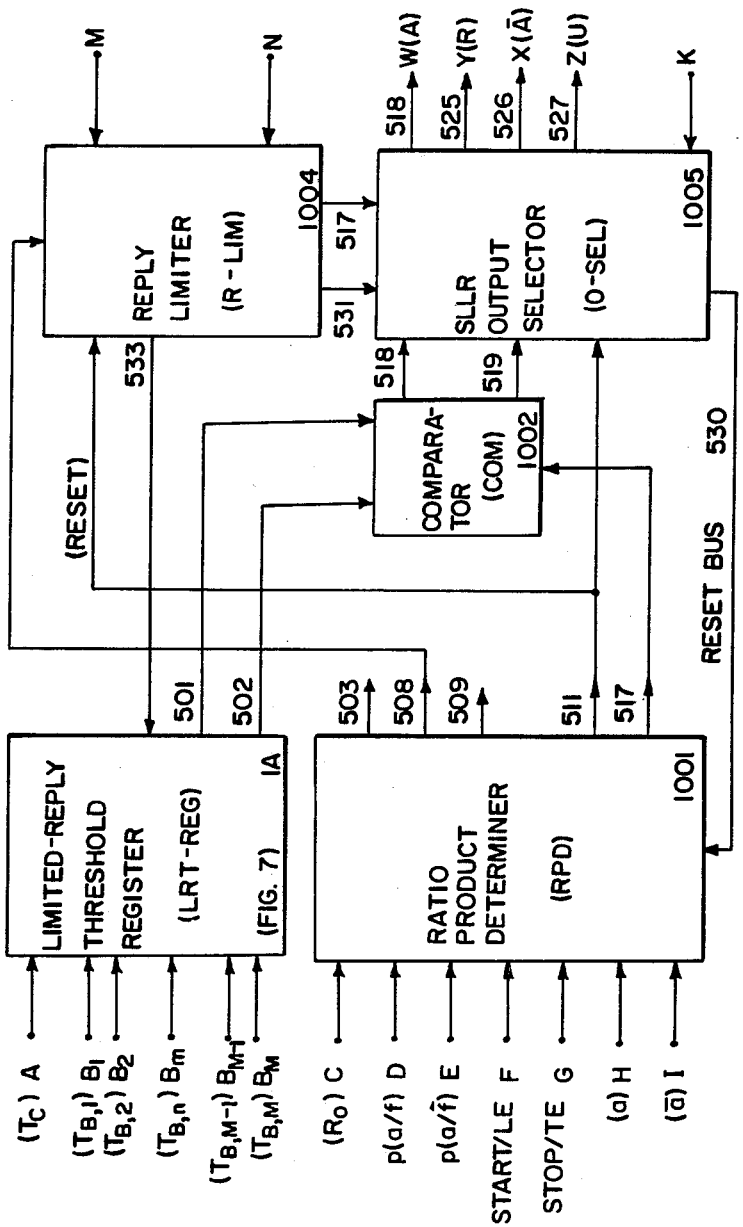
FIG. 2B SIMPLIFIED BLOCK DIAGRAM OF SLLR-SPRT

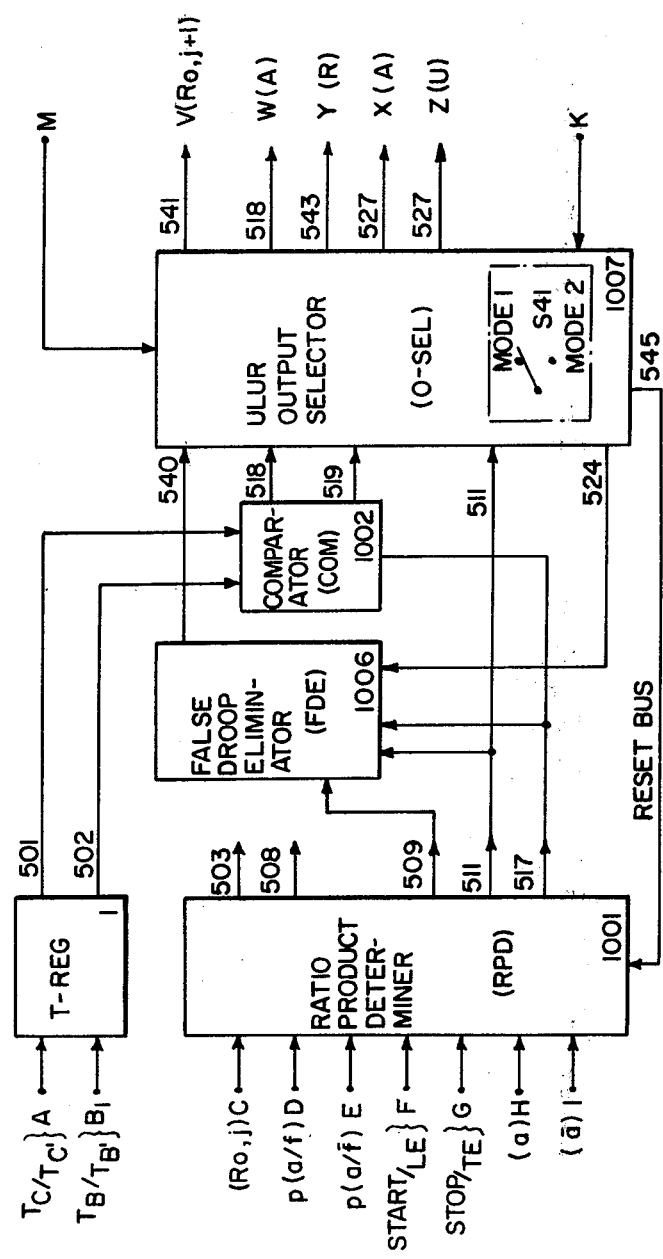
FIG. 2C SIMPLIFIED BLOCK DIAGRAM OF ULUR-SPRT

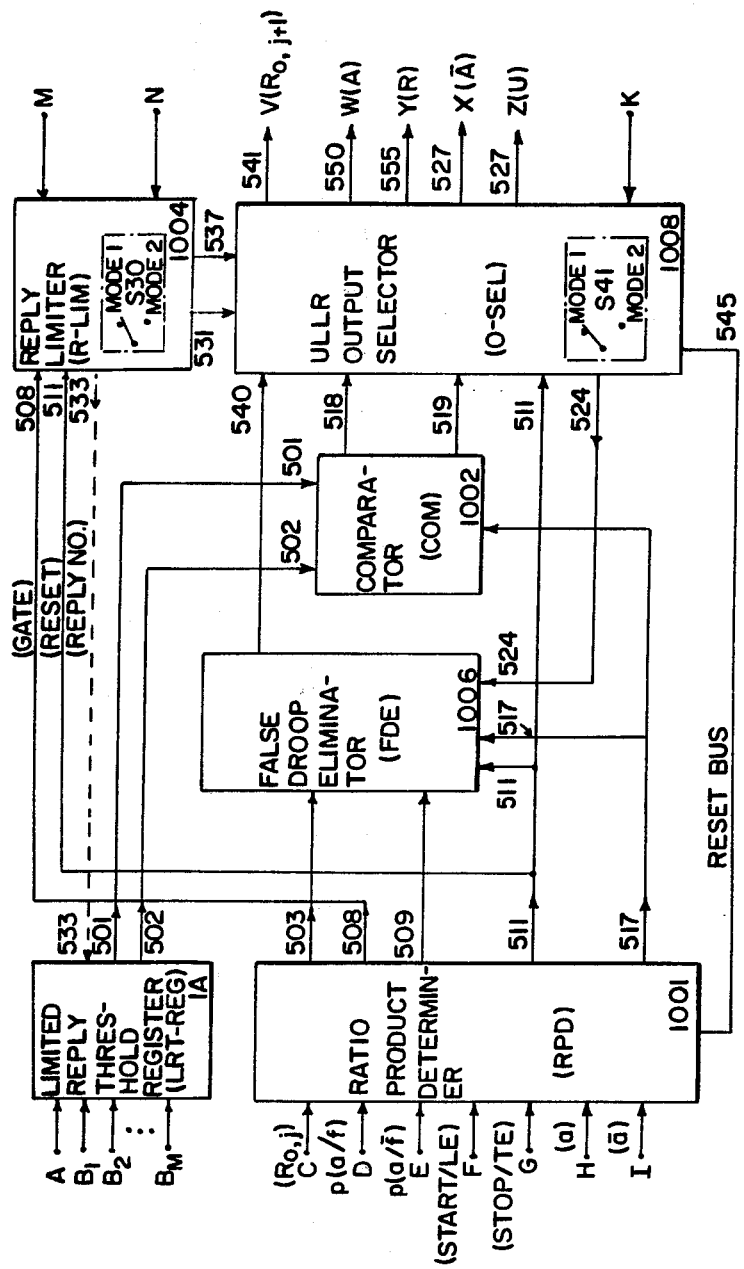
FIG. 2D SIMPLIFIED BLOCK DIAGRAM OF ULLR-SPRT

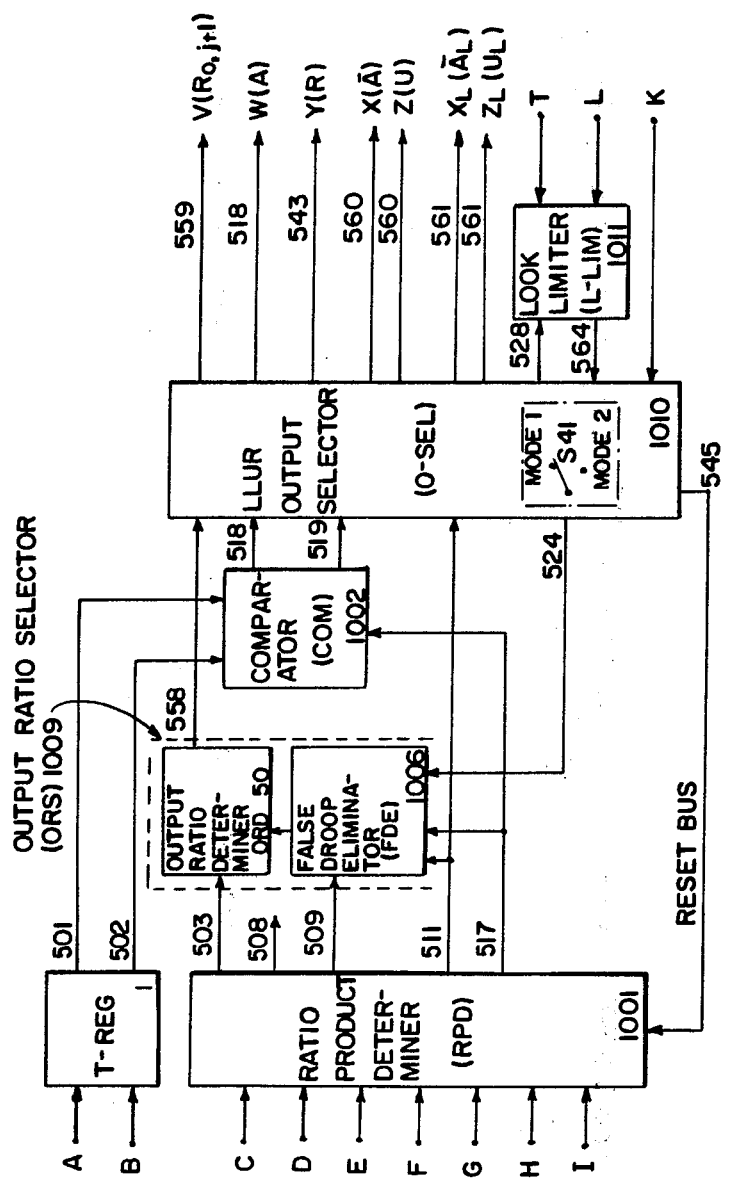

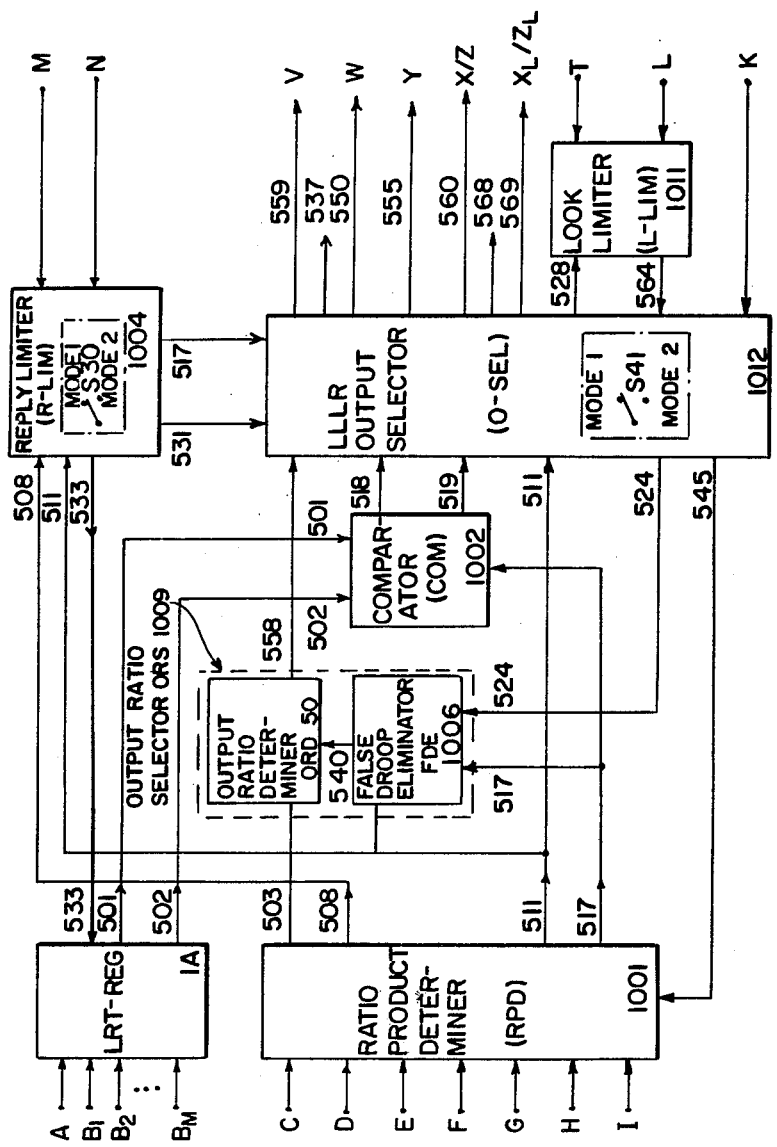
FIG. 2F SIMPLIFIED BLOCK DIAGRAM OF LLLR-SPRT

RATIO COMPUTER (RAC4)

NUMBER GATE (NOG 9 OR 10)

ACCUMULATIVE MULTIPLIER (TT14)

OUTPUT SELECTOR FOR MODE 2 ONLY OF THE SLUR-SPRT

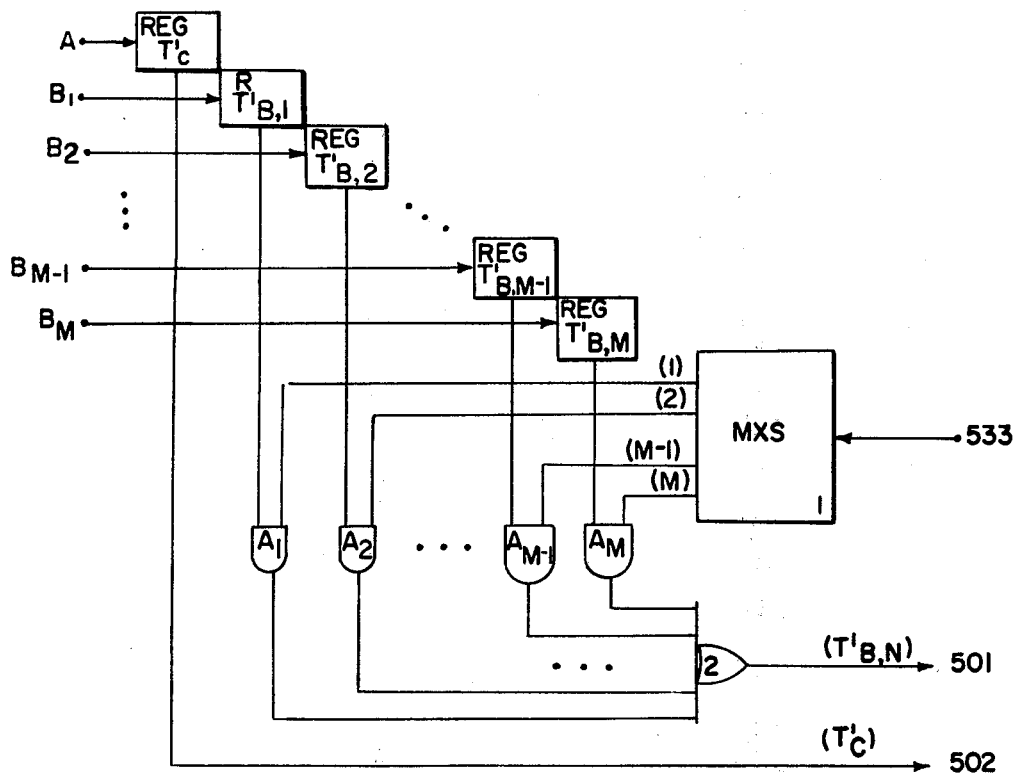
LIMITED REPLY THRESHOLD REGISTER (LTR-REG-IA)
FIG. 7
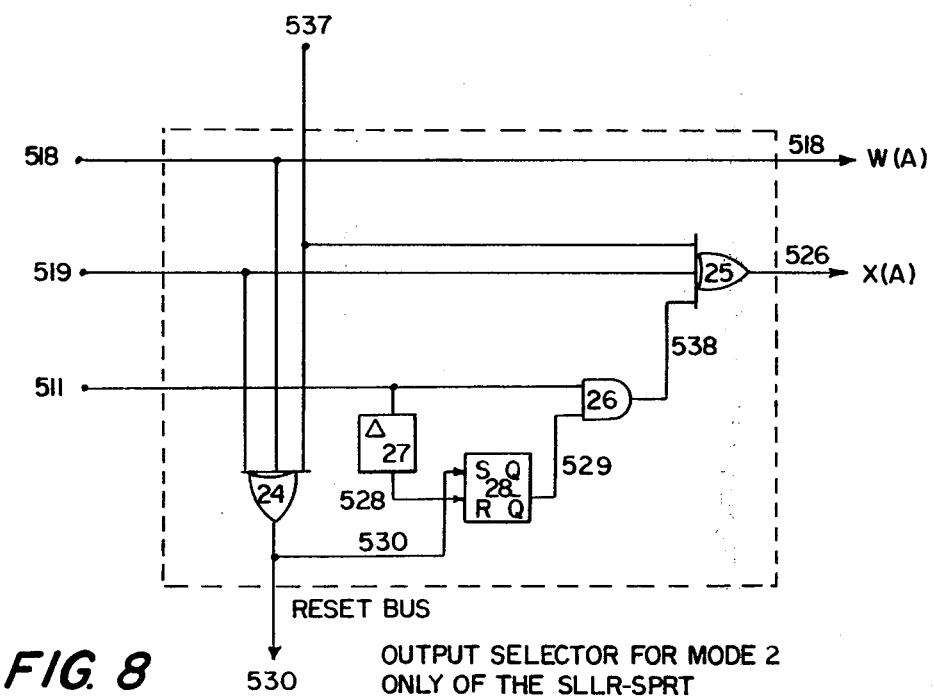
FIG. 8  OUTPUT SELECTOR FOR MODE 2 ONLY OF THE SLLR-SPRT

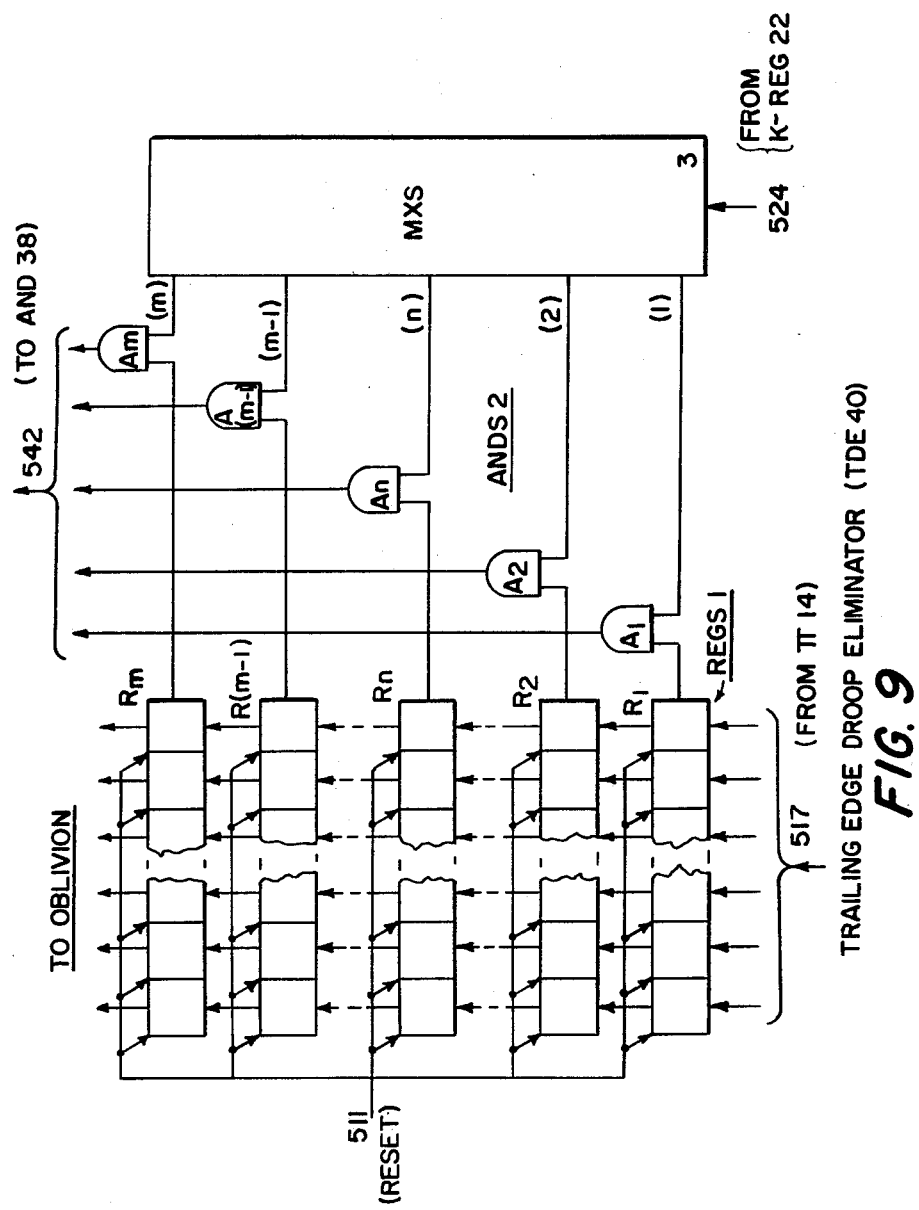

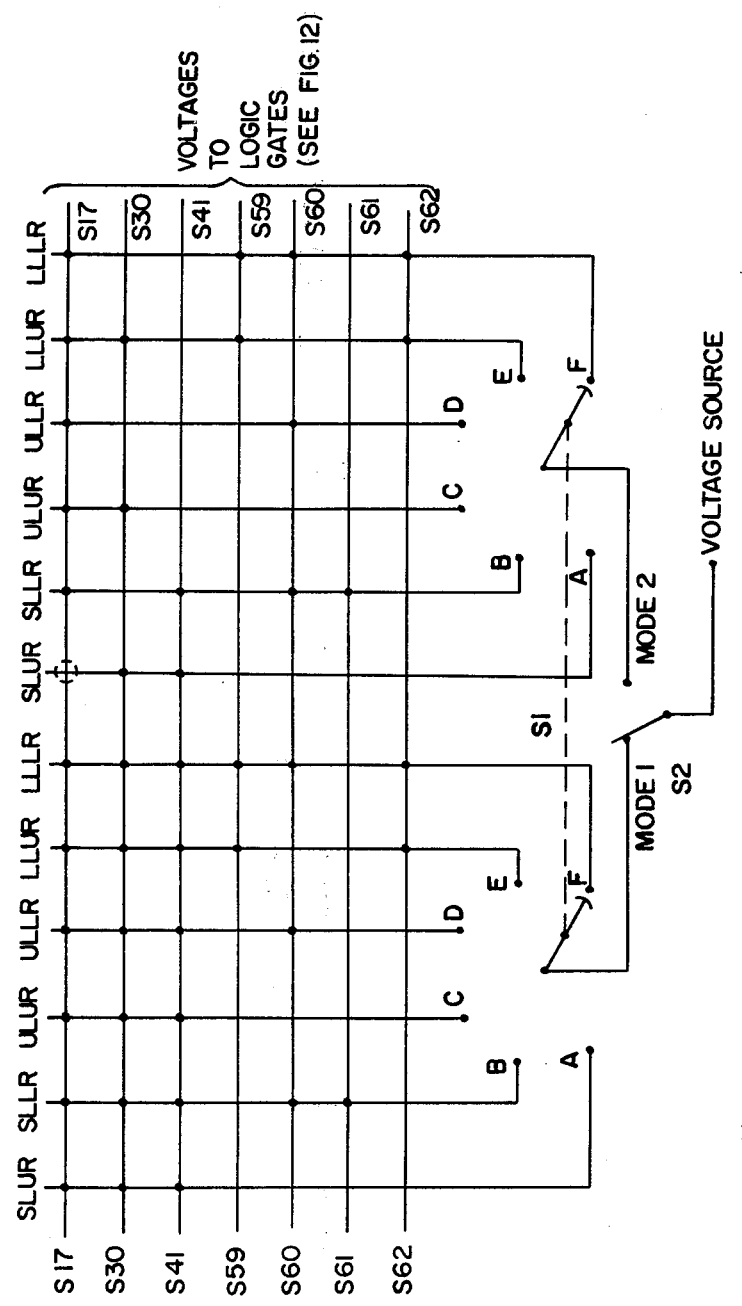
FIG. 11 MATRIX SWITCH FOR SPRT AND MODE SELECTION IN GP SPRT

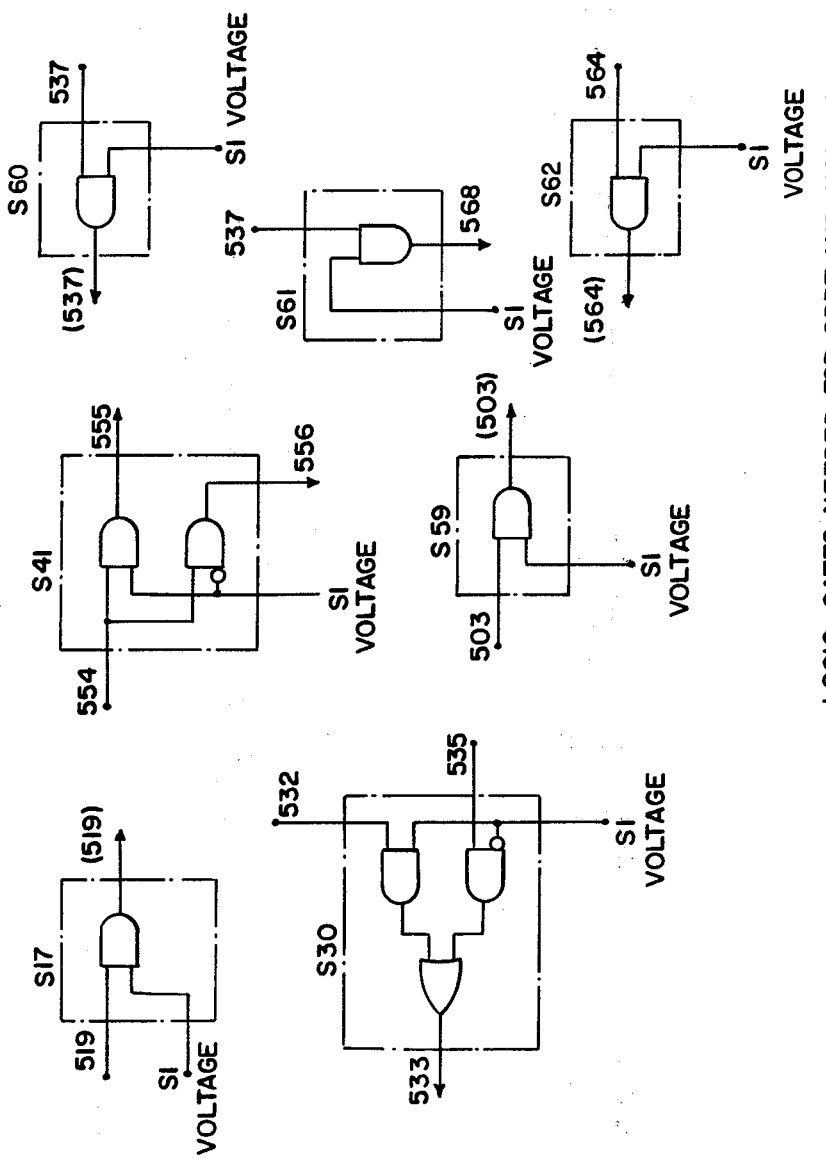
FIG. 12 LOGIC GATES NEEDED FOR SPRT AND MODE SELECTION

SEQUENTIAL PROBABILITY RATIO TEST FOR FRIEND IDENTIFICATION SYSTEM

BACKGROUND OF THE INVENTION

1. Field of the Invention

The invention relates to a Friend Identification (FI) system. More specifically the invention relates to the use of a sequential probability ratio test (SPRT) in making decisions in a Friend Identification system.

2. Description of the Prior Art

A Friend Identification system usually includes a device known as a 'Reply Evaluator' or 'Decider' that makes 'Friend-Accept' decisions in accordance with a specific procedure or algorithm after examining the replies received in response to a sequence of interrogations directed toward a detected but unknown target. If certain specified criteria are satisfied, the device makes an "Accept" (A) decision, and if they are not satisfied it makes a "Not Acceptable" ($\bar{A}$) decision.

In a cryptosecure interrogation-reply friend identification system, the interrogations are selected at random, and the correct reply to each interrogation is specified by the cryptosystem whose key setting is possessed only by friends. A friend's chance of providing the correct reply to any particular interrogation depends on the reliability of the equipment involved and the transmission medium. The friend's chance of providing a correct reply may be reduced by purposeful enemy interference or jamming, but the intensity and/or complexity of jamming required to render our friend identification system ineffective depends partly upon how efficiently we use the data that we can collect.

We are concerned here only with a cryptosecure friend-identification system in which a very large number of interrogations are possible, but in which the number of possible replies to each interrogation is very small. Thus, it is not possible for the reply evaluator to make a Friend-Accept (A) decision on the basis of a single acceptable (correct) reply. It must instead examine (observe) a sequence of replies elicited by a sequence of interrogations. Each sequence of replies elicited as the interrogator's antenna scans past (or 'looks' at) an unknown target corresponds to a sequence of observation in a sample of data to be evaluated, where the sample may be drawn at random from an 'acceptable' lot, the acceptable lot consisting of replies from a friend, or from an 'unacceptable' lot, and the unacceptable lot consisting of replies from a non-friend.

If the A and $\bar{A}$ decisions could always be made on the basis of a single scan past (look at) an unknown (target), then a Sequential Probability Ratio Test as defined in
A. Wald, "Sequential Analysis of Statistical Data: Theory" New York, Columbia University Statistical Group Report 75 (AMP Report 30.1) Sept. 1943 (Ref. 1)
$\bar{A}$. Wald, "Sequential Analysis", New York, John Wiley and Sons, Inc. 1947 (Ref. 2)
could be used with little modification to make these decisions. The 'Sequential Observer' decision device in the SAGE A11 Target Evaluator (SATE) does, in fact, use a variation of the Sequential Probability Ratio Test to make its decisions. The Sequential Observer gives each reply received a particular weight in accordance with the number of additional replies received having phase relationships such that they might have come from an enemy who is trying to appear as a friend, i.e., to 'spoof' the Friend Identification system. Since these so-called 'spoofing' signals could very well come from nearby friends, the Sequential Observer's method of making Friend-Accept (A) decisions is open to serious question (6).

The Sequential Observer bases decisions upon data collected during a single look at the unknown (target) whenever such data satisifies specific requirements for either an A or an $\bar{A}$ decision. But if the data from look does not call for a decision, the Sequential Observer collects another sequence of data from an additional look, and this process may be repeated several times. No use is made by the SATE of information collected during any look if it is not adequate to warrant making either an A or an $\bar{A}$ decision having a specified confidence level except that if neither decision is made after some predetermined number of looks, then the operator may make an $\bar{A}$ decision, and the operator may base his decision on the results obtained during several looks. In other words, the SATE A11 Target Evaluator does not correlate data obtained over several looks at the same target. Hence, some potentially useful data may be thrown away.

The present invention recognizes the fact that a friend's antenna may be in such a position (e.g., hidden by a wing) that no replies, or a very few replies, can be obtained during one or more looks. This requires having the capability of making an A decision on the basis of a single look whenever replies can be elicited from a friend. However, the invention also recognizes that there is no need to throw away data from a look because it is not quite good enough to warrant making an A decision. The data can be used along with data from succeeding looks to make a final A or $\bar{A}$ decision.

SUMMARY OF INVENTION

The present invention uses an improved sequential probability ratio test under the condition of both limited or unlimited replies to interrogations during both limited and unlimited looks at the target.

The theory of application of the Sequential Probability Ratio test to Friend Identification system is given in
W. B. Bishop and W. K. Gardner, "On the Sequential Probability Ratio Test in Friend Identification System", NRL (Naval Research Lab.) report 7916, Aug. 19, 1975. (Ref. 3)
The implementation of the theory into a usable system requires extensive technical innovation and is the subject of the present invention.

In the present invention, a single, limited number or unlimited number of looks may be made at a target. In addition, the number of replies evaluated for each look may be limited or unlimited. Six different subsystems will each perform the sequential probability ratio test under one of the above conditions (e.g., single look with unlimited reply) or the subsystem may be combined to form a complete system capable of performing any of the tests upon request. The six different subsystems are as follows:

single-look unlimited-reply: SPRT
single-look limited-reply: SPRT
unlimited-look unlimited-reply: SPRT
unlimited-look limited-reply: SPRT
limited-look unlimited-reply: SPRT
limited-look limited reply: SPRT These subsystems are all combined into a complete system called a general purpose, SPRT.

BRIEF DESCRIPTION OF THE DRAWINGS

FIG. 1C is a schematic of an limited-look unlimited reply SPRT device (ULUR-SPRT).

FIG. 1D is a schematic of an unlimited look limited reply SPRT device (ULLR-SPRT).

FIG. 2B is a simplified block diagram of the SLLR-SPRT.

FIG. 2C is a simplified block diagram of the ULUR-SPRT.

FIG. 2D is a simplified block diagram of the ULLR-SPRT.

FIG. 2E is a simplified block diagram of the LLUR-SPRT.

FIG. 2F is a simplified block diagram of the LLLR-SPRT.

FIG. 7 shows a limited-reply threshold register (LTR-REG-1A) of FIG. 1B.

FIG. 8 shows the output selector for mode 2 only of the SLLR-SPRT of FIG. 1B.

FIG. 9 shows the trailing-edge droop eliminator (TDE-40) of FIG. 1C.

FIG. 11 matrix switch for SPRT and mode selection in GP-SPRT.

FIG. 12 logic gates needed for SPRT and mode selection.

DESCRIPTION OF THE PREFERRED EMBODIMENT(S)

Although the Sequential Probability Ratio Test (SPRT) has been well known for many years, and much use has been made of it, thus far it has been used very little in Friend Identification (FI) systems. Each of the six SPRT devices described here is designed to operate with friend identification systems under particular circumstances. The first SPRT is designed for use where only a single sequence of replies is available, and no limit can be placed on the maximum number of replies to be evaluated. The second SPRT is for use also where only a single sequence of replies is available, but a fixed upper limit can be placed on the number of replies in the sequence. The next four SPRT decision devices are designed for use with a friend identification system that can obtain more than one sequence of replies from each unknown to be identified. Since both the number of sequences and the number of replies in each sequence may be either unlimited or limited, all four possibilities must be considered.

The single-look, unlimited-reply (SLUR) sequential probability ratio test (SPRT) device is the first of a series of devices designed to operate with an FI system. It makes decisions satisfying specified criteria by evaluating replies received in response to an unlimited sequence of interrogations sent to an unknown (target) during a single scan of the interrogator's antenna past the unknown, or during a single burst of any number of interrogations emitted while the interrogator's antenna is locked on the unknown. Each scan or burst of interrogations along with the replies it elicits is called a "look" at the unknown. The SLUR-SPRT is most efficient when the distribution of unacceptable replies in the look is uniform. It may be used in either of two different modes of operation. The first mode performs the operations called for in the convention (SPRT) (References 1,2). It provides three possible decisions:

(1) The accept (A) decision, indicating that the unknown can safely be accepted as a friend.

(2) The reject (R) decision, indicating that the unknown should be rejected because his replies are exceedingly poor.

(3) The unknown (U) decision indicating only that the unknown has not satisfied either the criterion for acceptance or the criterion for rejection.

The second mode of operation provides only two possible decisions:

(1) The accept (A) decision and (2) The not acceptable ($\bar{A}$) decision, indicating only that the accept criterion has not been satisfied. This second mode of operation is usually the more appropriate one for friend identification systems.

Figure 1A:
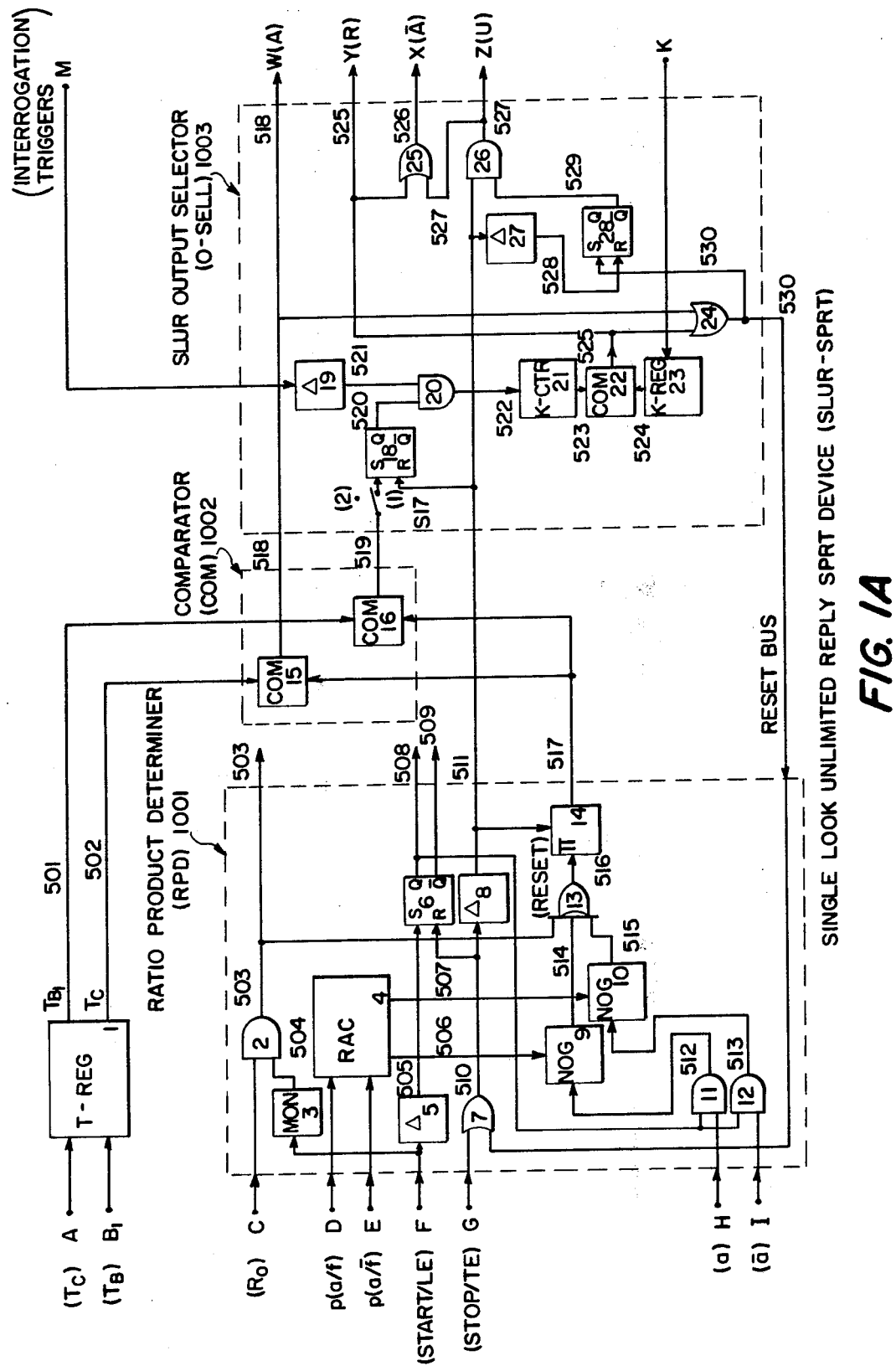
FIG. 1A is a schematic of a single look unlimited reply SPRT device (SLUR-SPRT).
Figure 2A:
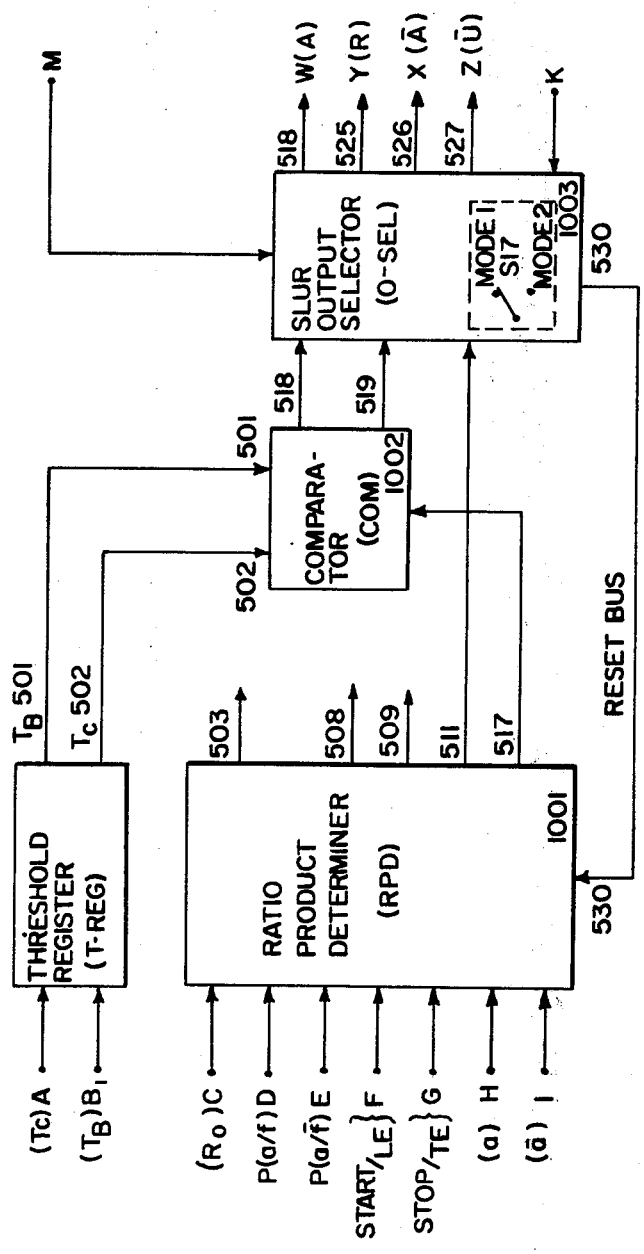
FIG. 2A is a simplified block diagram of the SLUR-SPRT.

FIG. 1A provides a detailed diagram of the single look unlimited reply sequential probability ratio test device (SLUR-SPRT) and FIG. 2A provides a simplified block diagram of it. Corresponding parts and lines of FIGS. 1A and 2A are labeled with the same numbers in order to simplify explanations.

Each block in FIG. 1A consists of either electronic components that are readily available from commercial suppliers, i.e., they are either listed in manufacturer's catalogs, or are easy to fabricate using items that are listed.

The SLUR-SPRT uses only one sequence of replies to make it decisions. However, the sequence may consist of any number of replies i.e., no limit is placed on N, where N is the number of replies to be evaluated. In its first mode of operation, this device makes its decisions by performing, very rapidly and accurately, precisely the functions of a standard sequential probability ratio test as described in references 1, 2. Wald described the mathematical processes fully but did not show how they could be performed automatically in real time by electronic circuitry. Some of the theory presented by Wald is needed to explain fully how the SLUR-SPRT operates.

Let $\alpha = P(R/F)$ — the probability that an R decision will be made concerning any particular unknown selected at random from those to be identified, given that the unknown is a friend, and let $\beta = P(A/\bar{F})$ = the probability that an A decision will be made concerning an unknown selected in the same manner, given that the unknown is not a friend.

The parameters $\alpha$ and $\beta$ are also known as "the probability of an error of Type I" and "the probability of an error of Type II, described in J. Neyman and E. S. Pearson "On the Theory of Testing Hypotheses in Relation to Probability a priori," Proc. Camb. Phil. Soc. 29, (1933). (Ref. 4)

J. Neyman and E. S. Pearson "On the Problem of Most Efficient Tests of Statistical Hypothesis," Phil. Trans., A (1933) (Ref. 5)

The parameters $\alpha$ and $\beta$ are a measure of the strength of the sequential probability ratio test (references 1, 2).

For the second mode of operation, where only the (A) and the ($\bar{A}$) decisions are made, a slightly different pair of parameters $\alpha_2$ and $\beta_2$ are needed. These parameters may be defined and related to the conventional parameters $\alpha$, $\beta$ in the following manner:

$\alpha_2 = P(\bar{A}/F)$ = the probability that an ($\bar{A}$) decision will be made, given that the unknown is a friend;

$$\beta_2 = \beta \qquad (1)$$

Note that, in both modes of operation, the probability of accepting a nonfriend as a friend is the same. In Mode I, an (R) decision can terminate the test, but no (R) decision as such is possible in Mode 2. The ($\bar{A}$) decision of Mode 2 means only that on the basis of all data available, the (A) decision cannot be made. Since friend identification systems can only make firm (A) decision, and since those not accepted may be enemies, neutrals, or friends, this second mode of operation is especially well suited for friend-identification systems (3).

The parameters ($\alpha$, $\beta$) and ($\alpha_2$, $\beta_2$) are very convenient for design purposes and, since they define how likely a device is to fail if certain prescribed operations are followed, their complements (1-$\alpha$) and (1-$\beta$), respectively, define how reliable the device is likely to be. It is for this reason that (1-$\alpha$) was called "reliability of Type I" and (1-$\beta$) was called "reliability of Type II" in Ref. 3.

Wald, in reference 1, 2 has shown that, for any ($\alpha$, $\beta$), an upper threshold number $T_C$ and a lower threshold number $T_B$ can be selected such that if an (A) decision is made whenever the ratio product (to be defined later) becomes equal to or greater than $T_C$, and an (R) decision is made whenever the ratio product becomes equal to or less than $T_B$, then the criteria ($\alpha$, $\beta$) will be satisfied. The unknown (U) decision is made if neither the (A) nor the (R) decision is possible. Reference 3 shows how thresholds $T_C'$ and $T_B'$ (similar to $T_C$ and $T_B$) can be selected for any ($\alpha_2$, $\beta_2$). For the friend identification application, the upper threshold $T_C'$ is selected so that $\beta_2 = P(A/\bar{F})$ will be satisfied even when a nonfriend is given every advantage that he can reasonably be expected to have. The lower threshold $T_B'$ is usually not very critical in this (second) mode of operation; i.e., a wide range of values will achieve identical results. Both theoretical and experimental ways of determining $T_C'$ and $T_B'$ are described in Ref. 3.

The ratio product, mentioned earlier, is the product of a sequence of ratios starting with an a priori ratio (usually equal to "1"). Each factor in the ratio product is a ratio or fraction (proper or improper), the numerator of which is the probability that a friend will produce the type of reply received, and the denominator of which is the probability that an enemy will produce the type of reply received. The $n^{th}$ ratio product thus consists of the a priori ratio product multiplied by n factors, each of which is determined by the reply received to an interrogation. If the total number of replies received (and hence evaluated) is N, and N is sufficiently large, then one or the other of the thresholds $T_C$ or $T_B$ will nearly always be crossed; so a decision, one way or the other will nearly always be made when Mode 1 operation is used. When Mode 2 operation is used, of course, either an (A) or ($\bar{A}$) decision is always made, but the ($\bar{A}$) decision corresponds more closely to the (U) decision of Mode 1 than it does to the (R) decision.

The operation of the SLUR-SPRT of FIG. 1A may not be described. For Mode 1 operation, the upper threshold number $T_C$ is sent to threshold register T-REG1 via input A in FIG. 1A. The lower threshold number $T_B$ is sent to T-REG1 via input $B_1$. (These threshold numbers are replaced with $T_C'$ and $T_B'$, respectively, for Mode 2 operation.)

Input of FIG. 1A is provided for the a priori probability ratio $$R_O = p(f)/p(\bar{f}), \qquad (2)$$

where p(f) = the a priori probability that any particular unknown selected at random from those to be identified will be a friend, and p($\bar{f}$) = the a priori probability that the same unknown will not be a friend.

If these a priori probabilities are unknown, or if only low confidence can be placed in any particular values given to them, them it is necessary to set $$p(f) = p(\bar{f}) \qquad (3)$$

and hence $$R_O = 1. \qquad (4)$$

Input D carries a number p(a/f), and input E a number p(a/$\bar{f}$), where p(a/f) = the probability than an acceptable reply will be received in response to any particular interrogation selected at random from those sent to a friend, and p(a/$\bar{f}$) = the probability that an acceptable reply will be received in response to any particular interrogation selected at random from those sent to any enemy.

The value of p(a/f) may be taken as what is conventionally called a friend's "round reliability," which is defined as the fraction of interrogations sent to him that produce acceptable replies. Usually, it is not difficult to determine a value for p(a/f), say $$p(a/f) = P_f \qquad (5)$$

such that nearly all friends will nearly always achieve values of round reliability at least as high as $p_f$. Operation of the SLUR-SPRT requires that a value for $p_f$ appropriate for the environment be selected prior to use of the SLUR-SPRT. The value $p_f$ may, of course, be changed from time to time to compensate for changing environmental conditions, but it is not normally changed while a particular sequence of replies is being evaluated.

The value of p(a/$\bar{f}$) may be taken as what is conventionally called an enemy's "guessability," which is defined as an enemy's chance of guessing the correct reply to any particular interrogation selected at random from the interrogations sent to him. A special signal analysis receiver, such as that used by the SAGE A11 Target Evaluator can determine a unique value for p(a/$\bar{f}$) corresponding to each interrogation to each unknown. However, Ref. 3 shows that an SPRT device can satisfy all reasonable values of ($\alpha$, $\beta$) or ($\alpha_2$, $\beta_2$) even if it is assumed that $$p(a/\bar{f}) = P_e \qquad (6)$$

where $P_e$ = the probability that an enemy will guess the correct reply to any particular interrogation selected at random from those sent to him when all possible parameters are in his favor, i.e., $P_e$ is the enemy's "best possible" chance of producing a correct reply by guessing.

In other words, the SLUR-SPRT can operate quite satisfactorily when Eq. (6) is true. However, if $$p(a/\bar{f}) < P_e, \qquad (7)$$

which is usually the case, then the SLUR-SPRT operation will be even better than predictions based on Eq. (6) indicate that it will be.

The SLUR-SPRT of FIG. 1A is designed to operate with either a fixed or varying value of $P_e$. The numerical examples provided in Ref. 3 cover only the "worst case," i.e., that in which only a fixed value of $P_e$ is available for use. Operation of the SLUR-SPRT would be improved, i.e., still fewer replies would be required for its decision, if a new value of $P_e$ were supplied along with each reply to be evaluated.

The fractions $p_f$ and $p_e$ to be used by the SLUR-SPRT are supplied to ratio computer RAC4 (see FIG. 1A), which uses them to compute the success factor S and the failure factor $\bar{S}$, where $$S = \frac{p_f}{p_e} \qquad (8)$$

$$\bar{S} = \frac{1 - p_f}{1 - p_e} \qquad (9)$$

Figure 3:
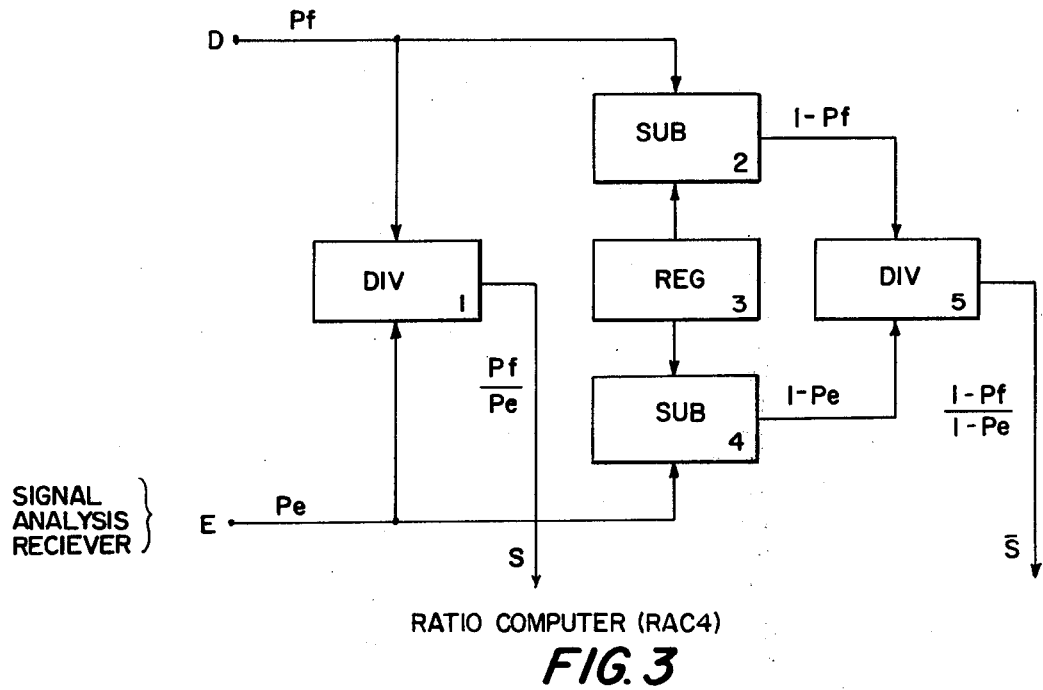
FIG. 3 shows the ratio computer (RAC4) of FIG. 1A.

FIG. 3 shows how the ratio computer RAC4 performs these operations. Note that the dividers DIV1 and DIV5 and the subtractors SUB2 and SUB4 are standard items available in manufacture's catalogs. Also, the register REG3, which merely supplies the number "1" to the subtractors, is purely conventional. Note also that RAC 4 computes the ratios S and $\bar{S}$ only once for a series of evaluations if $p(a/\bar{f})$ remains constant. However, it can easily compute new values as often as $p(a/f)$ and/or $p(a/\bar{f})$ can be changed.

Input F to FIG. 1A carries a pulse each time a leading-edge detector determines that the interrogator's antenna beam has started encompassing an unknown's transponder, and hence replies to be evaluated are being received. Input G carries a pulse each time a trailing-edge detector determines that the interrogator's antenna has moved away from the transponder. Leading-and trailing-edge detectors are known in the art. Since the trailing edge of an interrogator antenna beam cannot be detected until several interrogations that elicit no reply have been transmitted, and each of these failures to elicit a reply will produce a reduction in the ratio product $R_n$ computed by $\pi 14$ (to be explained later), the decider must be provided with a means of excluding these "missed" replies from evaluation. It is not difficult to determine a number K that is equal to or slightly greater than the average number of missed or "low-reliability" replies required by a trailing-edge detector to produce a trailing edge declaration.

This number K must be fed into the register K-REG 23 before operation of the SLUR-SPRT starts. How these last K replies are eliminated from consideration will be explained later.

Input H carries a pulse each time an acceptable reply (a) is received from the unknown, and input I carries a pulse each time the reply to an interrogation sent to the unknown is unacceptable ($\bar{a}$).

When the leading-edge pulse enters on F, it activates the Monostable Switch MON3, and after a delay produced by Δ5, it sets the reset-set switch RS6. The delay produced by Δ5 is equal to or slightly greater than the time required for MON3 to automatically deactivate itself. Activation of MON3 causes a voltage to be applied to the 504 input of AND2 for a short interval. During this short interval, AND2 is opened* so that the input $R_O$ on C can pass through AND2 and go on through OR13 to the accumulative multiplier $\pi 14$. (This output from AND2, which is labeled as output 503 "Ratio Product Determiner 1001," is used in later figures.)

* The voltage that opens an AND gate allows any signal on the gate's other input to pass through it.

The setting of RS6 causes its Q output 508 to be high, thus opening AND11 and AND12.

Each time the FI system determines that an acceptable reply to an interrogation has been received from the unknown to be identified, it causes a pulse to enter via H. While RS6 is set, this pulse passes through AND11 to the Number Gate NOG9, which then causes the number S (the success factor) provided by RAC4 to be sent through OR13 to $\pi 14$.

Each time the FI system determines that the reply to an interrogation sent to the unknown is unacceptable ($\bar{a}$), it causes a pulse to enter vis input I. This pulse will pass through AND12 (while RS6 is set) to the number gate NOG10 which will then cause the number $\bar{S}$ (the failure factor) provided by RAC4 to be sent through OR13 to 14.

Figure 4:
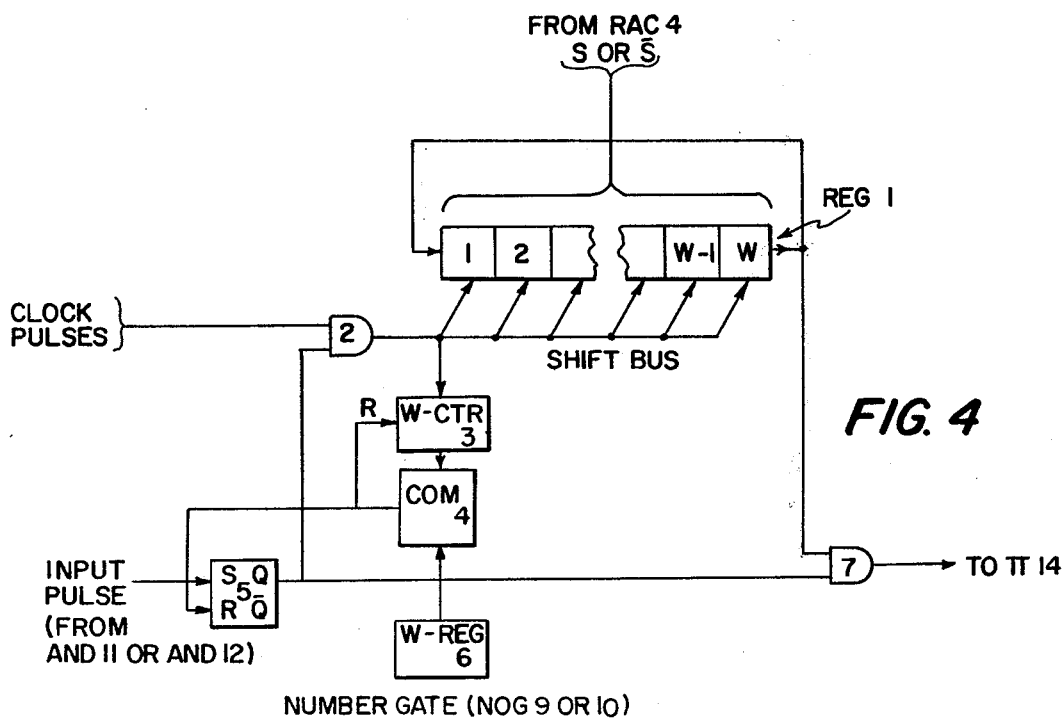
FIG. 4 shows the number gate (NOG9) or NOG10) of FIG. 1A.

FIG. 4 shows how the number gates NOG9 and NOG10 perform their functions. The success factor S and the failure factor $\bar{S}$ are stored in registers such as REG1 of FIG. 4 as soon as they are computed and supplied by RAC4 (see FIG. 3). Note: NOG9 and NOG10 are identical circuits, but NOG0 is supplied with the success factor S while NOG10 is supplied with the failure factor $\bar{S}$.

Each time a pulse enters the number gate (FIG. 4) it sets RS5, thus opening AND2 and AND7. As soon as AND2 of FIG. 4 is opened, clock pulses start passing through it. These clock pulses are counted by W-CTR3 as they cause the number stored in REG1 to be shifted out sequentially thorugh AND7 and also back into REG1 again.

At the time of installation, W-REG6 is provided with the number W, which is equal to the number of stages in REG1, and, of course, REG1 must be large enough to assure that every possible value of S or $\bar{S}$ can be stored in it.

When W-CTR3 reaches a count of W, the comparator COM4 produces an output pulse that resets RS5 and thus closes AND2 and AND7 until another input pulse arrives (from AND11 or AND12 of FIG. 1A). Note that after these W shifts, the contents of REG1 are the same as they were before clock pulses started the shifting process. This permits the value stored in REG1 to be used again when another reply is received, unless it is replaced by a new number from RAC4.

The action thus far described shows how the accumulative multiplier $\pi 14$ is provided first with the a priori probability ratio $R_0$ from AND2 of FIG. 1A, and is then provided with either the success factor S or the failure factor $\bar{S}$ corresponding to the reply elicited by each interrogation sent to the unknown to be identified, as long as RS6 remains set. Note: Receipt of no reply at all, as well as receipt of an incorrect reply, is considered to be an "unacceptable" reply and hence produces a failure factor $\bar{S}$.

The name "accumulative multiplier" is used here to indicate a device that multiplies its contents by each new input and continually records the resulting accumulated product. Thus $\pi 14$ accomplishes the function conventionally represented by the mathematical expression $$\prod_{i=1}^{n} x_i = (x_1)(x_2)\ldots(x_{n-1})(x_n). \tag{10}$$

Figure 5:
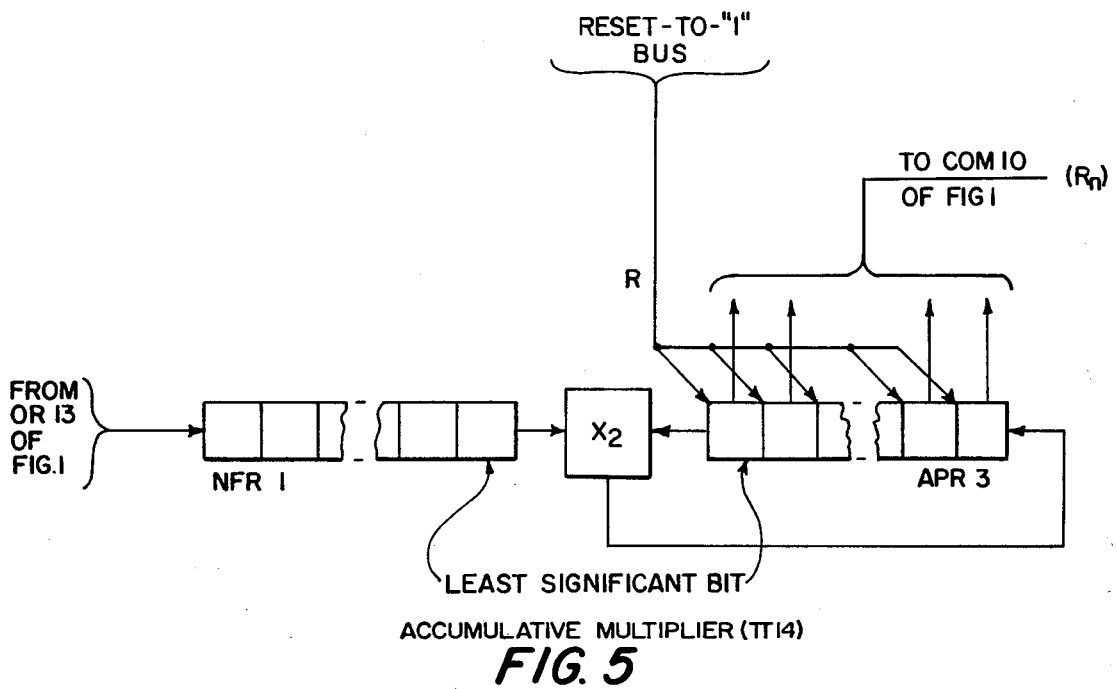
FIG. 5 shows the accumulative multiplier ($\pi$14) of FIG. 1A.

FIG. 5 shows how $\pi 14$ performs its required operations. In this figure, binary operations are shown since most readily available components perform such operations. The conventional circuits needed to change decimal numbers to binary numbers and vice versa have been omitted.

The accumulated product register APR3 is reset to the value "1" by a pulse on the reset-to-"1" bus before any input from OR13 arrives. Each number that enters new factor register NFR1, starting with the a priori ratio $R_O$, is multiplied by the number that happens to be in APR3. This multiplication is accomplished by the multiplier X2. Note that the bits from registers NFR1 and APR3 are transferred to X2 in the conventional way: least significant bits first. As each bit is transferred from APR3 to X2 for multiplication, a product bit is transferred back into the just-vacated position in APR3. Thus, when each multiplication has been completed, the new "accumulated" product will be in APR3. The bits from NFR1 must be kept in storage, of course, until each multiplication has been completed.

Each new product in APR3 is a ratio product as described earlier. These ratio products may be numbered consecutively. Thus, $R_0 =$ The a priori ratio product $R_1 =$ The ratio product after the reply to the first interrogation sent to the unknown after a leading edge pulse has entered on F has been evaluated.

$R_n =$ The ratio produce after the $n^{th}$ reply following the leading-edge pulse has been evaluated.

For the SLUR-SPRT, of course, no limit is placed on how large n may be; so there is no limit on the number of accumulated products that $\pi 14$ may produce during each look.

Each ratio product $R_n$, where $n = 0, 1, \ldots$, is transferred to comparators COM15 and COM16 as soon as it is computed. Whenever the ratio product $R_n$ becomes equal to or greater than the upper threshold $T_C$ (or $T_C'$ for Mode 2 operation) supplied by T-REG1 via lead 502, COM15 produces a pulse on 518 which goes to output W indicating that an (A) decision has been made. This output pulse on 518 also goes through OR24 to the reset bus 530, where it sets RS28, thus closing AND26. The pulse on the reset bus 530 also goes to the ratio product determiner RPD1001 where it resets the decider, thus making it ready to evaluate replies from another unknown. The closing of AND26 keeps any pulse on 511 from reaching output X or Z after an (A) decision has been made. More will be said about these actions later.

Whenever the ratio product $R_n$ produced by $\pi 14$ becomes equal to or less than the lower threshold $T_B$ (or $T_B'$) supplied by T-REG1 via lead 501, COM16 produces a pulse on output 519. This pulse goes through S17 (which is always in position 1 for Mode 1 operation) to set RS18, It thus opens AND20 so that interrogation trigger pulses (supplied from interrogator or IFF data procesor) entering on input M can, after a delay produced by $\Delta 19$, pass through AND20. The delay produced by $a19$ is long enough to allow any reply received in response to the interrogation triggered by a pulse on M to be evaluated before the pulse leaves $\Delta 19$. The pulses from AND20 are counted by the counter K-CTR21 until either a trailing-edge pulse enters on G or a count of K is reached. Whenever a count of K is reached, the comparator COM22 produces a pulse on its output 525. This pulse goes to output Y to indicate that an (R) decision has been made (for Mode 1 opeation), and it goes through OR25 to output X to indicate that an ($\bar{A}$) decision has been made (for Mode 2 operation). The thresholds $T_C'$ and $T_B'$ for Mode 2 operation are chosen so that the (A) decision will be made only when there is no longer any recognizable chance that continuation of the test could lead to an (A) decision. This means that the lower threshold $T_B'$ must be exceedingly low when no limit is placed on the number of replies to be evaluated. If $T_B'$ is not set low enough, or if a quick changeover from Mode 1 to Mode 2 is desired without changing the lower threshold $T_B$, then S17 may be moved to its position 2 so that the output 519 from COM16 cannot reach RS18.

The pulse from COM22 (which goes to output Y) also goes through OR24 to set RS28 and to reset the device.

If a trailing-edge pulse enters on G before an (A) decision has been made and before K-CTR21 has reached a count of K, i.e., fewer than K "reply evaluations" after an output from COM16 on lead 519 has occurred (if one has occurred), then this pulse (on G) goes through OR7 to reset RS6 and thus immediately close AND11 and AND12 so that no further pulses from H or I can pass. (The resetting of RS16 also produces a voltage on output 509 (i.e., undelayed reset signal) of the ratio product determiner RPD1001 for uses to be described later.) The pulse that enters on G also, after a slight delay produced by $\Delta 8$, (i.e., produced a delayed reset signal) resets $\pi 14$ to "1", resets RS18, goes to $\Delta 27$, goes through AND26 to provide an output on Z, and goes through OR25 to provide an output on X. The output pulse on Z indicates (for Mode 1 operation) that neither the (A) nor the (R) decision could be made on the basis of the sequence of replies available; so the (still) unknown (U) decision must be made. The output pulse on X, of course, indicates that the ($\bar{A}$) decision (for Mode 2 operation) has been made. Note that AND26 will be held open when the pulse from $\Delta 8$ arrives by the normally reset RS28. After a short delay produced by $\Delta 27$, the pulse from $\Delta 8$ (on 511) will go to the reset terminal of RS28 but will produce no action in this case.

If the pulse from COM22 on lead 525 occurs before a trailing-edge pulse enters on G, then this pulse, besides setting RS28 and producing outputs on Z and X, will also go through OR7 to reset the device in the same manner as the pulse from input G (just described) except that, in this case, AND26 will be closed when the pulse from $\Delta 8$ arrives. After the short delay produced by $\Delta 27$, the pulse from $\Delta 8$ will reset RS28.

In Mode 1 operation, an output pulse on W, Y, or Z indicates that the SLUR-SPRT is ready to evaluate a new sequence of replies (from another unknown), and in Mode 2 operation the same thing is indicated by a pulse on either output W or X.

It is perhaps not entirely obvious why the threshold $T_C'$ is usually slightly higher than the threshold $T_C$ even when the accept decision for both modes of operation must satisfy the same criterion, (i.e., $\beta_2 = \beta$). This comes about because Mode 2 operation gives extraordinary advantages to friends who experience bursts of interference and in the process gives nonfriends a very small increase in their chance of producing an acceptable sequence of replies. Reference 3 discusses in considerable detail how the thresholds $T_C'$ and $T_B'$ should be selected and illustrates the effect of different choices by means of typical numerical examples. The SPRT used for Mode 2 operation is a special test designed for FI systems, but it may also be suitable for use in other applications, such as in evaluating product reliability by sampling procedures. Such an application is described in W. B. Bishop, "Quality Control for a Quaranteed Product," Microelectronics and Reliability 13, 185–194, June 1974.

In summary, the SLUR-SPRT of FIG. 1A will, when operating in Mode 1, provide either an (A) output on W or an (R) output on Y if the replies received between the declaration of a "leading edge" and K replies before a trailing edge is declared permit either decision to be made with adequate confidence.

Note that the declaration of a leading edge indicates that the interrogator's antenna is beginning to encompass an unknown; the interrogator's antenna begins to move away from the unknown K replies before a trailing edge is declared; and a decision made with adequate confidence is a decision that satisfies prescribed criteria $(\alpha,\beta)$. If neither the (A) nor the (R) decision can safely be made, then the (U) decision will be indicated by an output on Z. If the replies to be evaluated are in response to a burst of interrogations sent via a non-scanning antenna, then the interrogator need only supply a pulse on input F when the burst starts and a pulse on input G when it stops. (No change in the circuit of FIG. 1A is needed)

Mode 2 operation is obtained by using thresholds $T_C'$ and $T_B'$ instead of $T_C$ and $T_B$ (entered on inputs A and $B_1$, respectively) and by using outputs W and X. If the replies received warrant making an (A) decision, a pulse will appear at output W. Otherwise, a pulse will appear at output X when the evaluation process has been completed. This pulse means only that the (A) decision cannot be made; so the ($\bar{A}$) decision must be made until more information becomes available.

The parts of FIG. 1A may be grouped as indicated by the dashed lines to produce units whose operation can be summarized briefly. These units will be used when appropriate to simplify explanations concerning later figures. FIG. 2A shows how these units may be used to simplify the SLUR-SPRT of FIG. 1A.

The threshold numbers $T_C$ and $T_B$ for Mode 1 or $T_C'$ and $T_B'$ for Mode 2 must be supplied to T-REG1 prior to operation of the SLUR-SPRT.

The ratio product determiner RPD1001 is composed of items 2-14 in FIG. 1A. It uses inputs C through I to produce the appropriate ratio product after each reply has been evaluated. Inputs C, D, and E composed of the a priori probability ratio $R_0$ and the probabilities p(a/f) and p(a/f̄) respectively, may be entered prior to use of the decider and allowed to remain fixed, or they may be changed as often as new values can be obtained. A pulse on input F (a leading-edge pulse when a scanning interrogator antenna is used) starts the evaluation process. A pulse on input G (a trailing-edge pulse) stops it. A pulse enters on H each time an acceptable reply is received from the unknown, and a pulse enters on I each time an unacceptable reply is received. (No reply at all is considered to be one form of "unacceptable" reply.)

Each ratio product $R_n$ produced is sent via 517 to the comparator COM1002, which compares it with the upper threshold $T_C$ (or $T_C'$) and the lower threshold $T_B$ (or $T_B'$) supplied by T-REG1. The comparator COM1002 produces an output pulse on 518 each time $(R_n \geq T_C)$, (or $R_n \geq T_C'$), and it produces an output pulse on 519 each time $R_n \leq T_B$ (or $R_n \leq T_C'$).

The outputs 518 and 519 from COM1002 are used by output selector O-SEL1003 along with an input on 511 from RPD1001, a fixed value K supplied before operation of the device starts, and trigger pulses entering via input M, to select the proper outputs on W, X, Y, and Z, and to send a reset pulse back to the ratio product determiner RPD1001 at appropriate times.

A pulse on output W indicates that the unknown should be accepted (A) as a friend (regardless of whether Mode 1 or Mode 2 is being used).

A pulse on output Y when the SLUR-SPRT is operating in Mode 1 (i.e., when the thresholds $T_C$ and $T_B$ are being used) indicates that the unknown should be rejected as a nonfriend, and a pulse on output Z (again in Mode 1) indicates that no decision can be made; so the unknown must remain unknown (U)

When Mode 2 is being used outputs Y and Z are ignored. A pulse on output X, however, means only that the unknown cannot safely be accepted as a friend; so the ($\bar{A}$) decision must be made.

Special care is taken to assure that the (R) decision of Mode 1 cannot be produced by the low round reliability normally present at the trailing edge of the interrogator's antenna beam. During the last K reply evaluations in any sequence, Mode 1 operation can produce only either the (A) or the (U) decision.

Figure 6:
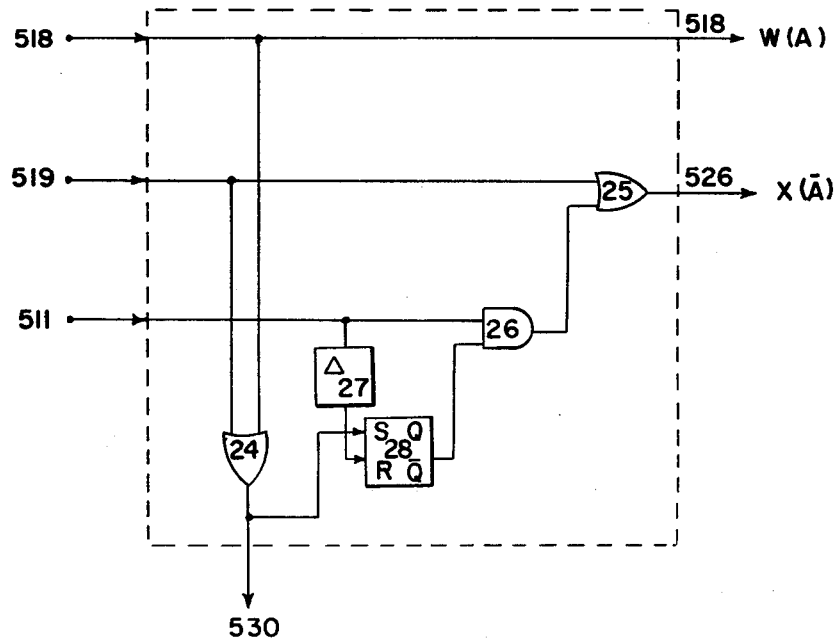
FIG. 6 shows the output selector for mode 2 only of the SLUR-SPRT of FIG. 1A.

If the SLUR-SPRT is to be used only for its Mode 2 operation, then a much simpler output selector than that shown in FIG. 1A may be used. FIG. 6 shows how simple it can be. Note that the inputs K and M and the counting and comparing circuits have been eliminated, since they were required only for the Y output, which is not used in Mode 2 operation.

The three unused outputs 503, 508, and 509 from the ratio product determiner RPD1001 are needed in SPRT devices to be discussed later. Output 503 carries the a priori probability ratio $R_0$ entered on input C; output 508 is simply a "high" or gating voltage that remains present between the time that a pulse on input F starts the evaluation process and a pulse on input G or a final (A) or (R) decision stops it. Actually, there is a very slight delay between the arrival of a pulse on F and the start of the gating voltage. The switch S17 must be in its Mode 1 position for Mode 1 operation. However, Mode 2 operation can be obtained either by changing input thresholds and output connections alone, or by changing the switch setting as well as input thresholds and output connections. Use of the Mode 2 setting increases the reliability of Mode 2 operation somewhat and permits decisions to be made a little more rapidly.

2.3 Summary of SLUR-SPRT Functions

General

The circuits required for the SLUR-SPRT are exceedingly simple, readily available, and highly reliable. It can easily be adjusted to satisfy different sets of criteria and can easily use input data from different types of sources. Its use in either of its modes of operation eliminates the need for placing an upper limit on the number of replies that may be used in making decisions.

Mode 1

In its Mode 1 operation, the SLUR-SPRT
(1) Performs the conventional sequential probability ratio test in real time. Its operation, thus, does not depend upon stored success-failure sequences or "m successes out of n trials" tables as required for many current applications of the SPRT. This real-time computation gives the SLUR-SPRT great flexibility in evaluating new and changing data from various types of sources.

(2) Makes certain that low-reliability replies produced as the interrogator's antenna moves away from an unknown will not produce a reject (R) decision.

(3) Indicates automatically whether any sequence of replies warrants either an (A) or an (R) decision, and if neither is warranted, indicates (also automatically) that no valid decision can be made.

(4) Is especially useful in evaluating replies when the distribution of unacceptable replies in the sequence is uniform and no upper limit can be placed on the number to be evaluated.

Mode 2

In its Mode 2 operation, the SLUR-SPRT:
(1) Performs a modified SPRT in real-time. This test provides either the (A) or the ($\bar{A}$) decision as required by friend identification systems without requiring that an upper limit be placed on the number of replies to be evaluated.

3.0 SINGLE-LOOK, LIMITED-REPLY SPRT

3.1 Purpose

The Single Look Limited Reply (SLLR) SPRT device is the second in a series of special devices designed to operate with a friend identification system. It mades decisions by evaluating replies received in response to a sequence of N or fewer interrogations sent to an unknown during a single scan of the interrogator's antenna past the unknown, or during a single burst of N or fewer interrogations emitted while the interrogator's antenna is locked on (beamed toward) the unknown, i.e., during a single look at the unknown.

Reference 3 shows that when the maximum number of replies to be evaluated in a look is known, this information can be used to improve the quality of decisions made by both the standard SPRT and a particular truncated form of it. The SLLR-SPRT described here shows how the theoretical advantages described in Ref. 3 can be realized in practice. The SLLR-SPRT described here, just as the SLUR-SPRT described in Sec. 2.0, is most efficient when the distribution of unacceptble replies in the look is uniform, and it too may be used in either of two modes of opertion. In Mode 1, it makes (A), (R), or (U) decisions, and in Mode 2 it makes (A) and ($\bar{A}$) decisions satisfying specified criteria, as described in Sec. 2.1.

3.2 Description and Operation

Figure 1B:
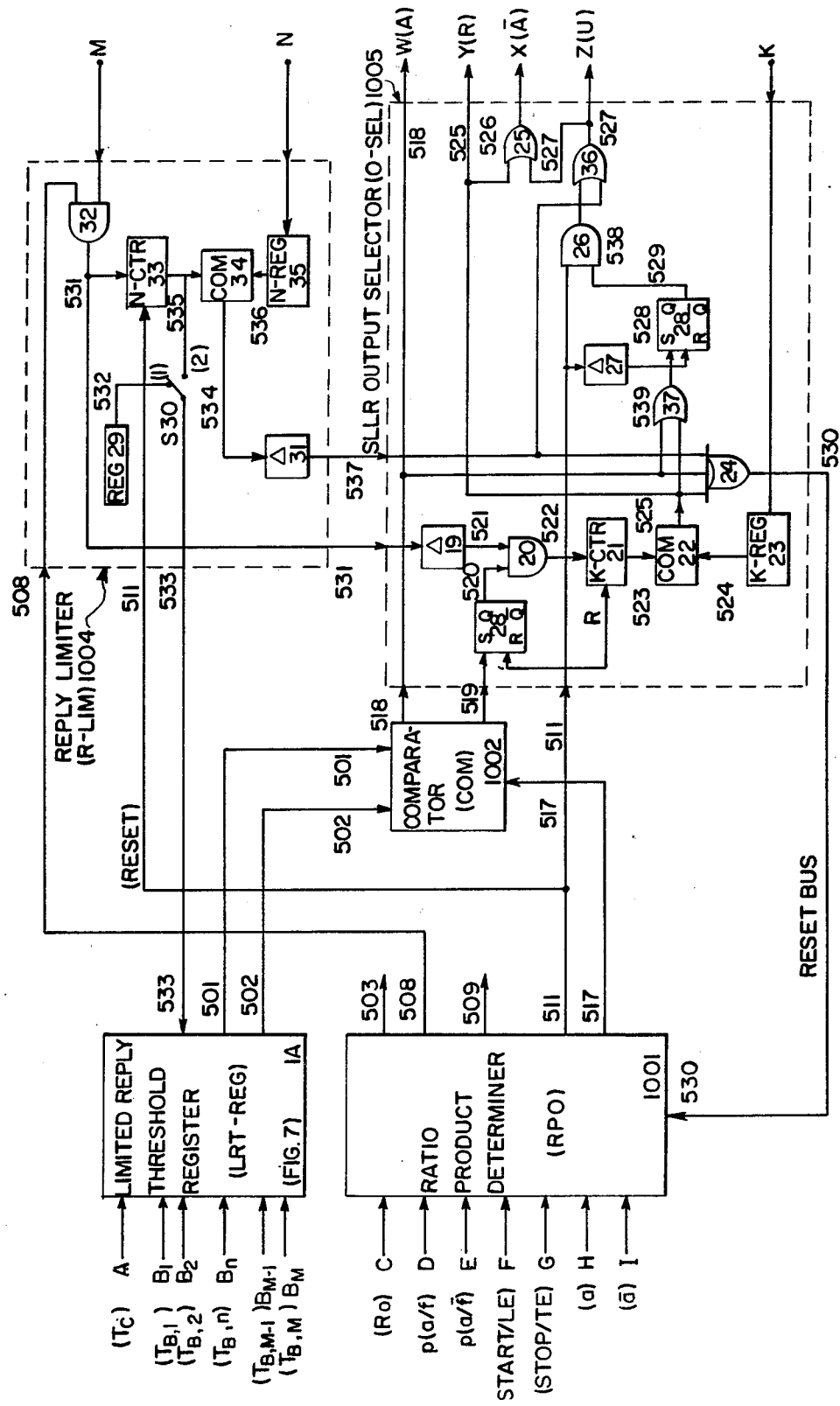
FIG. 1B is a schematic of a single-look limited-reply SPRT device (SLLR-SPRT).

FIG. 1B provides a detailed diagram of the Single Look, Limited Reply (SLLR) SPRT, and FIG. 2B provides a simplified block diagram of it. The ratio product determiner RPD1001 and the comparator COM1002 of FIGS. 1B and 2B are the same as correspondingly labeled items in FIGS. 1A and 2A.

There are two major differences between the SLLR-SPRT and the SLUR-SPRT described in Sec. 2.0. First, a reply limiter R-LIM1004 stops the reply evaluation process as soon as (the predetermined number) N replies have been evaluated. And second, a limited-reply threshold register LRT-REG1A replaces the exceedingly simple threshold register T-REG1 of the SLUR-SPRT. This limited-reply threshold register is supplied with a set of lower thresholds for its Mode 2 operation (instead of a single threshold) prior to operation of the SLLR-SPRT, and these thresholds are supplied to the comparator COM1002 selectively. A different threshold can be supplied for each of the N replies to be evaluated. Reference 3 describes how these lower thresholds $T_{B,1}, T_{B,2}, \ldots, T_{B,N}$ can be selected so that decisions will be made on the basis of the smallest number of replies that will still give friends every possible opportunity to be accepted. In other words, neither the (R) decision of Mode 1 nor the ($\bar{A}$) decision of Mode 2 will be made unless there is no longer any reasonable chance that evaluating further replies could produce an (A) decision.

Mode 1 Operation

For Mode 1, only inputs A and $B_1$ to the limited-reply threshold register are used. The upper threshold number $T_C$ is entered via input A and the lower threshold number $T_{B,1}$ is entered via input $B_1$. In general, $T_C$ is lower and $T_{B,1}$ is higher than the corresponding upper and lower thresholds required for the SLLR-SPRT of Sec. 2.0 (see Ref.3).

The limited-reply threshold register LRT-REG1A performs exactly like the threshold register 1 of FIG. 1A when the switch S30 is in the "Mode 1" position. FIG. 7 shows how this action is accomplished. The register REG 29 (of FIG. 1B) contains only the number "1", thus, when S30 is in the Mode 1 position, the number "1" is entered via lead 533 into the matrix switch MSX1 of FIG. 7. When this happens, MXS1 provides an output voltage on its lead (1) which opens ANDA1 so that the number $T_{B',1}$ stored in REG $T_{B',1}$ will be allowed to pass through ANDA1 and OR2 to output 501. Note that the number $T_C'$ stored in REG-$T_C'$ is always available at output 502 as required. The action of the limited-reply threshold register LRT-REG1A when S30 is in the Mode 2 position will be explained later.

Prior to operation of the SLLR-SPRT of FIG. 1B, the numbers K and N must be antered via inputs K and N, respectively. The number K is the same as that described in Sec. 2.0 for the SLUR-SPRT i.e., K is the average number of low-reliability replies required to produce a trailing-edge indication - and N is the maximum number of replies to be evaluated during the look. It is now common practice to limit the number of replies to be evaluated to a fixed number N (Ref. 3). The number K is stored in K-REG23, and the number N is stored in N-REG35.

Input M to FIG. 1B carries "interrogation trigger" pulses. A pulse enters via M each time the IFF interrogator, or the IFF data processor associated with it, triggers, i.e., starts to produce, a new interrogation.

When a leading-edge pulse enters on input F, the ratio product determiner RPD1001 produces a voltage on 508 that opens AND32 so that the interrogation trigger pulses entering on M can pass to N-CTR33 and to Δ19. These pulses are counted by N-CTR33, and when a count of N is reached, the comparator COM34 produces an output pulse on 534. This pulse on 534 is delayed by Δ31 long enough to allow any reply elicited by the interrogation produced by the Nth trigger pulse to be evaluated by both the trailing-edge determiner of the IFF data processor and by RPD1001 before the pulse leaves Δ31.

If COM1002 produces an output on 518 (indicating that $R_n \geq T_C$) before the pulse from Δ31 (indicating that the look of N replies has been completed) enters the SLLR output selector O-SEL1005, the pulse on 518 goes to output W to indicate that an accept (A) decision has been made.

If COM1002 produces an output on 519 before the pulse from Δ31 enters O-SEL1005, the pulse on 519 will set RS18 and thus open AND20. When AND20 is opened, delayed interrogation trigger pulses from Δ19 (see Sec. 2.0) will pass through AND20 to K-CTR21, which will count them until a count of K is reached unless a pulse from Δ31 enters O-SEL1005, or a trailing-edge pulse enters on G first. When a count of K is reached, COM22 produces an output on 525 that goes to output Y, indicating that the (R) decision has been made, and through OR25, OR37, and OR24. The pulse through OR37 sets RS28, thus closing AND26. The pulse through OR25 provides an output on X for use in Mode 2 operation. The pulse through OR24 resets the device. Note that the pulse on 511 from RPD1001, which results shortly after the reset pulse appears on 530, will be unable to pass AND26 at this time because of the earlier setting of RS28.

If a pulse from Δ31 enters O-SEL1005 before K-CTR22 reaches a count of K and before a trailing-edge pulse enters on G, then this pulse will pass through OR36 to output Z (and on through OR25 to output X). This output on Z will indicate that neither the (A) nor the (R) decision could be made on the basis of the N replies evaluated, and hence the (U) decision must be made. (The output on X is used only in Mode 2 operation.) The pulse from Δ31 will also pass through OR37 to set RS28 and through OR24 to reset the device as just described for the pulse from COM22 (on 525).

If a trailing-edge pulse enters on G before K-CTR21 reaches a count of K and before N-CTR33 reaches a count of N, then the resulting pulse from RPD1001 on lead 511 will reset RS18 and N-CTR33, and it will also go through AND26 (which will then be held open by the normally reset RS28) and OR36 to provide an output on Z. This output on Z also indicates that the unknown to whom interrogations have been sent must remain unknown. In this case the (U) decision has to be made on the basis of fewer than N replies, because fewer than N replies were available for evaluation during the look. The pulse from OR36 also goes through OR25 to output X for use in Mode 2 operation. Also the pulse on 511, after a short delay produced by Δ27, resets RS28 so that the device will be fully ready to process replies from another unknown. Note: The ratio product determiner RPD1001 is automatically reset by a trailing-edge pulse.

Mode 2 Operation

For Mode 2 operation of the SLLR-SPRT the switch S30 must be set in the Mode 2 position and a different set of threshold numbers must be entered into the limited-reply threshold register LRT-REG1A. Reference 3 shows how an upper threshold $T_C'$ and lower thresholds $B_1', B_2', \ldots B_M'$ can be chosen so that the prescribed set of criteria $\alpha_2$ and $B_2$ will be satisfied when this truncated sequential probability ratio test, also described there, is used. The Mode 2 operation of FIG. 1B is a physical realization of the test procedure described in Ref. 3.

When S30 is in the Mode 2 position, each number counted by N-CTR33 is transferred to LRT-REG1A, the details of which are shown in FIG. 7.

The upper threshold number $T_C'$ is entered via input A to REG $T_C'$. The lower threshold numbers $T_{B',1}, T_{B',2}, \ldots, T_{B',M}$ are entered into registers REG $T_{B',1}, T_{B',2}, \ldots, T_{B',M}$ respectively. Note: a separate lower threshold number is entered for each value of n, where $1 \leq n \leq M$ and $M \geq N$. This permits the value of N to be changed without requiring new lower threshold inputs (in practical systems M need not be greater than 64). It may be noted that Ref. 3 cites cases where several of the lower threshold values may be the same, but the device of FIG. 1B is made flexible enough to permit each of these thresholds to have any desired value.

FIG. 7 shows how the numbers from N-CTR33 (entering via 533) cause the appropriate lower thresholds to be selected as replies are evaluated. Note first that the upper threshold $T_C'$ is simply stored in REG-$T_C'$ and is thus always available on output 502 so that COM1002 can compare it with each ratio product $R_n$ that is produced by RPD1001.

As each number from N-CTR33 enters LRT-REG1A, the matrix switch MXS1 causes a voltage to appear on the output lead corresponding to the number received. This output voltage opens the appropriate AND gate $A_n$ where $n = 1, 2, \ldots, M$, so that the lower threshold $T_{B',n}$ corresponding to the number "n" from N-CTR33 will be supplied to COM1002. Note again that when the number "1" is supplied to MXS1, then LRT-REG1A performs exactly the same functions as T-REG1 for inputs A and B1. This fact makes the change from one mode of operation to the other quite simple.

Operation of the SLLR-SPRT of FIG. 1B in Mode 2, after the inputs and switch setting described above have been provided, is the same as that for Mode 1 except that for Mode 2, only outputs X and W are used.

Whenever the ratio product $R_n$ becomes such that $$R_n \geq T_C', \tag{11}$$

COM1002 will produce a pulse on 518 which will go to output W to indicate that an (A) decision has been made.

Whenever $$R_n \leq T_{B',n}, \tag{12}$$

COM1002 will produce a pulse on 519 which will set RS18. As described for Mode 1 operation, this action will cause a pulse to appear on output X and Y just K reply evaluations later if a pulse there has not already been produced by the arrival of a leading-edge pulse on input G or a pulse from Δ31 due to a count of N having been reached by N-CTR33. Thus, there will always be an output pulse on X if none appears on Y during a look. In other words, the (A) decision is made if and only if the (A) decision cannot be made during the look. Note: Reference 3 shows how the lower thresholds $T_{B',n}$ can be so chosen that the $(\bar{A})$ decision, even if made before N replies have been evaluated, will never occur unless there is no chance that an (A) decision might occur if the full N replies were evaluated.

If only Mode 2 operation is required, then the output selector O-SEL1005 may be replaced by the exceedingly simple output selector shown in FIG. 8, and S30 may be eliminated (or connected permanently in the Mode 2 position). This output selector eliminates the waiting period imposed by the circuits which prevent an (R) decision from being made due to poor replies during the K evaluations nearest the trailing edge of the interrogator antenna's beam. It thus always provides the $(\bar{A})$ decision, if one is warranted, at the earliest possible time. Consequently, use of the simple output selector of FIG. 8 will increase the capacity (number of unknowns per unit time) that the SLLR-SPRT can handle.

FIG. 2B provides a simplified block diagram of the SLLR-SPRT of FIG. 1B. Note that the reply limiter R-LIM1004 and the output selector O-SEL1005 are units in FIG. 1B. Operation of the SLLR-SPRT may be summarized quite briefly with use of this diagram.

For both modes of operation, RPD1001 computes the ratio product $R_n$ for each of the n replies received immediately following the arrival of a leading-edge pulse on input F. Also upon receipt of a pulse on input F, RPD1001 causes (via lead 508) the reply limiter R-LIM1004 to count the number of interrogations sent to the unknown (and hence the number of replies evaluated). On receipt of trailing-edge pulse on input G, it stops this count and sends a pulse via 511 to both R-LIM1004 and to the output selector O-SEL1005. The number of replies evaluated is always less than or equal to N. Thus $n \leq N$. Mode 1: In this mode of operation the comparator COM1002 produces an output on 518 whenever $$R_n \geq T_C \qquad (13)$$

where $T_C$ is an upper threshold number stored in the limited reply register LRT-REG1A. This output pulse goes to output W to indicate that an (A) decision has been made.

Also, COM1002 produces an output pulse on 519 whenever $$R_n \leq T_{B,1} \qquad (14)$$

where $T_{B,1}$ is a lower threshold number stored in LTR-REG1A. If this otuput on 519 occurs at least K reply evaluations before a trailing-edge pulse enters on input G, O-SEL1005 causes a pulse to appear at output Y and X. The pulse on output Y indicates that the (R) decision has been made (output X is not used in this mode of operation). If R-LIM1004 determines that N replies have been evaluated before there has been an output from COM1002, then O-SEL1005 causes a pulse to appear at output Z and X. The pulse on output Z indicates that neither the (A) nor the (R) decision can be made, so the decision (still unknown (U) must be made. That is, the replies obtained during the look are not suitable for changing the status of the unknown. The output on X, again is not used in Mode 1. Mode 2: In this mode of operation, a different set of thresholds $T_{C'}$, $T_{B',1}, T_{B',2}, \ldots, T_{B',M}$ is used. The reply limiter R-LIM1004 indicates to LTR-REG1A which of the lower thresholds $T_{B',1}, T_{B',2}, \ldots, T_{B',M}$ is to be used with each ratio product. The comparator COM1002 produces an output on 519 whenever $$R_n \geq T_{C'} \qquad (11)$$

and the O-SEL1005 then causes a pulse to appear on output W indicating that the (A) decision has been made.

The comparator produces an output on 519 whenever $$R_n \leq T_{B',n} \qquad (12)$$

where $N = 1, 2, \ldots, N$.

As in Mode 1 operation, if this pulse occurs before R-LIM1004 has determined that N replies have been evaluated and before a trailing-edge pulse enters on G, O-SEL1005 causes a pulse to appear on output Y and X. And, as in Mode 1, if N replies are evaluated or the trailing-edge pulse enters before an output at 519 (or 518) of COM1002 occurs, a pulse appears on output X and Z.

In this mode of operation, only outputs W and X are used. Thus, an output on W indicates that the (A) decision has been made, and an output on X indicates that the $(\bar{A})$ decision has been made.

In both modes of operation, whenever there is an output on W, Y or Z (or X) the device is reset and thus made ready for receipt of replies from another unknown.

When only Mode 2 operation of the SLLR-SPRT is required, the very simple output selector shown in FIG. 8 may be used in place of SLLR output selector O-SEL1005. Note that the output selector of FIG. 8 provides only the two required outputs on W and X and one on the reset bus.

3.3 Summary of SLLR-SPRT Functions

General

The SLLR-SPRT uses the same type of simple, reliable, and readily available circuits as the SLUR-SPRT to perform real-time operations. Also, it can easily be adjusted to satisfy different sets of criteria while evaluating data from different types of sources. The SLLR-SPRT makes use of advance knowledge that no more than N replies will be available for evaluation during each look to increase considerable the friend's chance of being accepted without giving an enemy a similar advantage. Its use of the SPRT makes it more efficient, i.e., capable of making valid decisions on the basis of fewer replies on the average, in both of its modes than existing and/or currently proposed friend accept deciders.

Mode 1

In its Mode 1 operation, the SLLR-SPRT (1) uses a truncated form of the SPRT to provide the same decisions as described for the SLUR-SPRT (2) makes certain that low-reliability replies produced as the interrogator's antenna moves away from an unknown will not produce a reject (R) decision (3) is especially useful in evaluating sequences of replies where the distribution of unacceptable replies in the sequence is uniform and an upper limit can be placed on the number of replies to be evaluated.

Mode 2

In its Mode 2 operation, the SLLR-SPRT performs a modified truncated sequential probability ratio test in real time. This test provides either the (A) or the ($\bar{A}$) decision on the basis of a fixed number N or fewer replies. It is thus especially suitable for use with FI systems that automatically limit the number of replies available in each sequence: for example, those that use scanning antennas.

4.0 UNLIMITED-LOOK, UNLIMITED-REPLY SPRT

4.1 Purpose

The unlimited-look unlimited-reply (ULUR) sequential probability ratio test (SPRT) device is designed to operate with an FI system that can wait for decisions until large numbers of replies obtained during many looks at an unknown have been collected and evaluated. An interrogation-reply friend identification system that operates with a long-range scanning surveillance radar would be of this type if its scanning antenna could be made to dwell upon unidentified objects for indeterminate lengths of time whenever desired. The ULUR-SPRT, just as the SLUR-and SLLR-SPRT's described in Secs. 2.0 and 3.0, makes (A), (R), or (U) decisions in its first mode of operation and (A) or ($\bar{A}$) decisions in its second mode of operation. If differs from the two earlier SPRTs described and from all existing friend accept deciders (FADs) in that it is designed to carry over data from one sequence of replies to another (from the same unknown) so that full use is made of all available data in making decisions. In this sense ULUR-SPRT opens a new approach to the analysis of data obtained by a scanning secondary (or primary) radar system as well as by an FI system.

The techniques required for storing evaluated data (always just a number when the ULUR-SPRT is used) from one look to another at the same unknown (object) and recalling it at the proper time are now readily available, although only a few years ago they were considered too complex to be of any practical value.

The ULUR-SPRT extends the evaluation techniques of the SLUR-SPRT to data obtained from any number of looks at an unknown. And, no upper limit is placed on the number of replies that each look may provide.

4.2 Description and Operation

FIG. 1C provides a detailed diagram of the unlimited-look, unlimited-reply sequential probability ratio test device (ULUR-SPRT), and FIG. 2C provides a simplified block diagram of it. The threshold register T-REG1, the ratio product determiner RPD1001, and the comparator COM1002 are the same as those described in Sec. 2.0 (FIG. 1A). The extension of the SPRT techniques to data from multiple looks is accomplished by making the ratio product achieved prior to the time reduction (or droop), produced as the interrogator's antenna moves away from an unknown, available for use as the a priori ratio product for the next look at the same unknown.

In Mode 1 operation, the (A) and (R) decisions may be made at any time during any look and are always final. It should be noted at the outset, however, that the (R) decision can result from a nonuniform distribution of unacceptable replies and hence would be suspect in some applications. In other words, Mode 1 operation of the ULUR-SPRT is safe to use only when interfering signals, which are a likely cause of a nonuniform distribution of unacceptable replies, are not present. If the FI system is not equipped with a means of detecting interfering signals, then Mode 1 should not be used.

The unknown (U) decision may also be made at the end of any look when mode 1 is being used, but this decision is not final for the ULUR-SPRT. It means only that as far as the particular look which produces it and all preceding looks at the same unknown are concerned, neither the (A) nor the (R) decision can be made. The unknown (U) decision is always accompanied by a new a priori probability ratio (on output V) to be used on the next look at the same unknown. The unknown (U) decision can be final only if physical conditions, such as the lack of time available before action must be taken, prohibit further looks at the unknown.

In Mode 2 operation, the ULUR-SPRT operates very much in the same manner as the SLUR during each look. The accept (A) decision is always final, and the ($\bar{A}$) decision means that no more interrogations during the particular look are needed. However, each ($\bar{A}$) decision is accompanied by a new a priori probability ratio (on output V) that may be used for the next look at the same unknown. The ($\bar{A}$) decision can be final only if physical conditions prohibit further looks at the unknown.

The thresholds $T_C$ and $T_B$ for Mode 1 operation and the thresholds $T_C'$ and $T_B'$ for Mode 2 operation are the same as those for the SLUR-SPRT of Sec. 2.0 are entered via inputs A and $B_1$ in the same manner.

The a priori ratio $R_{O,j}$ is entered via input C prior to the first look at any unknown. This ratio $R_{O,j}$ is the same as the ratio $R_O$ of the SLUR-SPRT. The notation "$R_{O,j}$" where $1 \leq j < \infty$ (used both here and in Reg. 3, which provides the theory upon which the ULUR-SPRT design is based), refers to the a priori ratio product used for the $j^{th}$ look. Hence when $j = 1$, $R_{O,j}$ becomes $R_{O,1}$ and is identical to the "$R_O$" used in Sec. 2.0.

Mode 1 Operation

A leading-edge pulse on input F starts the evaluation process just as in the SLUR-SPRT. Whenever the ratio product $R_{n,j}$ produced by the ratio product determiner RPD1001 during any look becomes such that $$R_{n,j} \geq T_C \tag{15}$$

the comparator COM1002 produces a pulse on output 518 that goes directly through the output selector O-SEL1007 to provide a pulse on output W indicating that the (A) decision has been made. The output also goes through OR37 to set RS28 and on through OR42 to reset the device in a manner similar to that described for the SLUR-SPRT.

Whenever, during any look, $$R_{n,j} \leq T_{B,n'} \tag{16}$$

COM1002 produces an output pulse on 519 that sets RS18 and thus opens AND20. This action causes K-CTR21 to count the number of reply evaluations made after the output on 519 occurs. If K-CTR21 reaches a count of K (the number of reply evaluations required to produce a trailing-edge indication after trailing-edge droop starts) before a trailing-edge pulse enters on input G, then COM22 produces a pulse on 525. This pulse goes through S41 and via lead 543 to output Y to indicate that an (R) decision has been made. It also goes through OR 37 to reset RS28 and on through OR42 to reset the device.

If a trailing-edge pulse enters on G before K-CTR21 has reached a count of K* then RPD1001 produces a voltage on its output lead 509 (see FIG. 1A) that opens AND38 so that the ratio product stored in the trailing-edge droop eliminator TDE40 K reply evaluations earlier can pass through AND38 and on through AND39 (in O-SEL1007) to output V, where it becomes the a priori ratio product labeled $R_{O,j+1}$ to be used for the next look at the same unknown. (How this ratio product is provided by TDE40 will be explained later.) As soon as the ratio product $R_{O,j+1}$ has been provided to output V, RPD1001 produces a pulse on its output 511. This pulse resets TDE40, RS18, and K-CTR21, goes to Δ27, and goes through AND26 to output Z, thus indicating that as far as this look (and all preceding looks) at the unknown are concerned, the unknown must remain unknown (U).

*Note: This includes the case where there has been no output on 519, so K-CTR21 is still set at zero.

Note that in the ULAR-SPRT the outputs Z and X always carry the same signals. They are shown as separate outputs in FIG. 1C only to make the outputs of all related devices consistent. Gate AND26 is held open when the pulse on 511 arrives by the normally reset RS28. Shortly after the output on Z has been produced, the pulse from 511 emerges from the delay element Δ27, but in this case accomplishes nothing since RS28 will already be in the reset position. The switch RS28 will be set at the time a pulse arrives from Δ27 only when this pulse has been preceded by a pulse on output W or output Y. Each such pulse sets RS28 before its action of resetting the device produces a pulse on output 511 from RPD1001. Also, when RS28 is set, there can be no succeeding output on Z, because AND26 will then be closed, and there can be no output on V at the time because AND39 will be closed.

Each ratio product $R_{n,j}$ produced by RPD1001 on its output 517 goes to the trailing-edge droop eliminator TDE40 as well as to COM1002. The number K stored in K-REG23 is always applied via lead 524 to TDE40. FIG. 9 shows how TDE40 stores the ratio products, and for any particular ratio product $R_{n,j}$, always makes the ratio product $R_{n-K,j}$ produced K reply evaluations earlier available to the 542 input of AND38. The number K represents the number of interrogations required for the trailing-date detector to locate a trailing edge after the reliability of replies starts to be reduced because the trailing edge of the interrogator antenna's beam is approaching the unknown.

Since this reduction in reliability will produce a drop in the ratio products produced (a trailing-edge droop), the ratio products produced after the lower reliability starts must be eliminated. The value of K should not have to be greater than 8 in an installation that has a good trailing-edge detector, has a reasonably sharp interrogator antenna beam, has a conventional antenna rotation rate, and operates at a reasonable interrogation repetition rate. Some of the installations now in use, however, might require values of K as large as 16. In any case, the value of K should be selected when the ULUR-SPRT is installed, and need not be changed thereafter unless one or more of the above-mentioned parameters (trailing-edge detector characteristics, interrogator antenna characteristics, antenna rotation rate, or interrogation repetition rate) is changed. Reference (3) explains how the proper choice of K can be made so that the sequential probability ratio test will be valid no matter how many looks are taken at an unknown.

In FIG. 9, the registers REGS1 are so connected that the number stored in each of the registers R1, R2, ..., R(m−1) is shifted to the next register each time a new number enters from π14 of RDP1001 via lead 517 (see FIG. 1A). The number in the last register $R_M$ is shifted out to oblivion (i.e., erased) when the $(m+1)^{st}$ number enters R1. Each of the m registers is connected to a correspondingly numbered AND gate (AND A1, A2, ..., Am).

The number K, stored in K-REG23 (see FIG. 1C) before use of the ULUR-SPRT starts, causes the matrix switch MXS3 to produce an output on the $K^{th}$ lead, i.e., the lead going to $ANDA_K$ for any K such that $$1 \leq K \leq m. \tag{17}$$

Thus, after RPD1001 has produced K-1 ratio products during any look, then for each succeeding ratio product $R_{n,j}$ produced, TDE40 will make available to the 542 input of AND38 the ratio product $R_{n-K,j}$ produced K reply evaluations earlier. This ratio product $R_{n-K,j}$ is transferred through AND38 to input 540 of AND39 each time the gating voltage appears on lead 509 of RPD1001 (see FIG. 1A). Since this gating voltage appears (in Mode 1 operation) only when the ULUR-SPRT has been unable to make either the (A) or the (R) decision in a particular look, the ratio product $R_{n-K,j}$ will go through AND38 and AND39 to output V only when the (U) decision is made for the given look. This ouput on V is labeled $R_{O,j+1}$ in FIG. 1C because it is the a priori probability ratio for the $(j+1)^{st}$ look. The process described above may be summarized by the expression.

$$R_{O,j+1} = R_{n-K,j} \tag{18}$$

where n is the number of replies evaluated in the $j^{th}$ look.

Shortly after the new a priori probability ratio $R_{O,j+1}$ reaches output V, a pulse appears on output 511 of RPD1001 (due to the action of Δ8 as shown in FIG. 1A). This pulse, besides performing the functions already described, resets all registers of TDE40 to zero. Note that if the FI system is equipped with a data processor that prevents a trailing-edge declaration from being made until at least K evaluations following the leading-edge declaration have been completed, then TDE40 need not be reset, for all obsolete data will then have been shifted out before any new data can be requested from TDE40. The ULUR-SPRT can process data from another unknown as soon as it has been reset by the pulse on 511.

The process of obtaining a new a priori ratio product $R_{O,j+1}$ may be repeated any number of times (as more looks are taken at the same unknown) until finally either an (A) or (R) decision is made or the evaluation process is stopped for reasons external to the ULUR-SPRT.

In summary, the ULUR-SPRT while operating in Mode 1 makes the standard sequential probability ratio test as defined by ref. 1, 2 applicable to multiple looks at the same unknown. If the interrogator's antenna is not scanning, then, of course, the trailing-edge droop eliminator TDE40 is not needed. Its action can be eliminated by simply setting $K = 1$. Whence, the latest ratio product will automatically be sent to output V at the appropriate time.

The manner in which (R) decisions are made guarantees that only interrogations that the unknown should be able to answer will be used in making such decisions, and the use of $R_{n-K,j}$ as the a priori ratio product for the $(j + 1)^{st}$ look provides a valid extension of the sequential probability ratio test to any number of looks. Reference 3 shows why this extension is valid.

Mode 2 Operation

Besides inserting the thresholds $T_C'$ and $T_B'$ in place of $T_C$ and $T_B$ in T-REG1 as described earlier and not using the Y output (output X is the same as Z), the switch S41 in the ULUR output selector O-SEL1007 must be set to its Mode 2 position before the ULUR-SPRT can be operated in that mode. When these changes are made, the ULUR-SPRT will make (A) decisions based on replies obtained from multiple looks and will satisfy the criterion $\beta_2$ defined in Sec. 2.0, even when no upper limit is placed on either the number of looks or the number of replies in each look. The $(\bar{A})$ decision made at the end of each look in which no (A) decision was made, as mentioned earlier, is always accompanied by a new a priori probability ratio $R_{O,j+1}$ to be used on the next look at the same unknown. If the evaluation process is not terminated until a reasonably large number of replies from several looks has been evaluated and no (A) decision has been made, then the resulting $(\bar{A})$ decision will satisfy criterion $\alpha_2$ as defined in Sec. 2.0.

When S41 is placed in its Mode 2 position, no change is made in the way (A) decisions are made, and the evaluation process during any particular look is still stopped each time there is an output from COM22 on lead 525. However, since this output does not indicate an (R) decision in Mode 2 operation, the evaluation process must be continued by taking another look at the same unknown. The required continuation of the evaluation process is provided by the fact that S41 keeps the pulse on 525 from resetting RS28. Instead, the pulse on 525 goes directly via lead 544 and OR42 back to RDP1001. Thus, when the gating voltage appears on output 509 of RPD1001 and allows the ratio product $R_{n-K,j}$ stored in TDE40 to pass through AND38, AND39 will be open (since RS28 will still be reset) so that $R_{n-K,j}$ can go on to output V as requried. Also, the pulse that follows on output 511 shortly after $R_{n-K,j}$ reaches V will be able to pass through AND26 to provide an output on X, thus indicating that an $(\bar{A})$ decision was made for this look.

FIG. 2C provides a simplified block diagram of the ULUR-SPRT. The summary of the operation of the ULUR-SPRT is based on this diagram.

When the switch S41 in the output selector O-SEL1007 is set in the Mode 1 position and thresholds $T_C$ and $T_B$ are provided to T-REG1, an output on W will be provided whenever an (A) decision is warranted by the SPRT, and an output on Y will be provided whenever an (R) decision is warranted. If neither of these decisions is made during the first look at a particular unknown (target), then the false droop eliminator FDE1006 provides an output on 540 which goes through O-SEL1007 to output V. This output is the ratio product $R_{n-K,j}$ obtained K reply evaluations prior to the last reply in the look. Gating voltages on leads 509 from RPD 1001, plus the "K" input on lead cause this action to take place. The required ratio product was obtained from RPD1001 earlier via lead 511 and stored until needed.

An IFF data processor, not a part of the ULUR-SPRT, can store the ratio product $R_{n-K,j}$ supplied to output V until another look is taken at the same unknown, at which time it is used as a new a priori probability ratio for input C. The process may be repeated any number of times until either an (A) or an (R) decision is made, or the process of evaluation has to be terminated for reasons external to the ULUR-SPRT, such as no further time being available, for example.

Each time a look ends, a pulse appears at output Z (as well as the ratio product at V) if neither the (A) nor the (R) decision has been made. Thus, if the evaluation process is terminated after any look before an (A) or an (R) decision has been made, then the unknown (U) decision results.

For Mode 2 operation, S41 must be in the Mode 2 position and the thresholds $T_C'$ and $T_B'$ must be entered into T-REG1. For this mode of operation, only outputs W and X (X is the same as Z) are used. Thus, only the (A) or $(\bar{A})$ decision is possible. The method of carrying over evaluated data in the form of a probability ratio (ratio product) is the same for both modes of operation except that in Mode 2 the evaluation process can be stopped only by an (A) decision, whereas in Mode 1 the (R) decision can also stop it.

4.3 Summary of ULUR-SPRT Functions

The ULUR-SPRT makes either the conventional SPRT or a modified version of it applicable to data obtained from any number of independent sequences. In its Mode 1 operation, the ULUR-SPRT makes (A), (R), or (U) decisions. In its Mode 2 operation, it makes only the (A) and $(\bar{A})$ decisions.

The ULUR-SPRT uses the same type of simple, reliable, and readily available circuits as the SLUR-SPRT and the SLLR-SPRT.

The technique of putting analyzed data into "ratio" form and using it as an a priori probability ratio for the analysis of subsequent data, offered by the ULUR-SPRT, permits valid decisions to be made concerning data that would produce no decisions when analyzed by current techniques. This technique has several variations which appear in the following parts of this application.

The ULUR-SPRT also eliminates the effect of poor (low-reliability) replies that normally occur near the trailing edge of an interrogator antenna's beam as it rotates. These low-reliability replies, if not eliminated would invalidate the SPRT as a means of evaluating replies obtained from more than one look. A special false droop eliminator is used to eliminate these low-reliability replies and simultaneously to select the appropriate analytical result (probability ratio) for use in the next sequence of replies to be evaluated. Thus the ULUR-SPRT carries the process of reply evaluation considerably further than the SLLR-SPRT, which also eliminated the effect of these low-reliability replies in its Mode 1 operation.

5.0 UNLIMITED-LOOK, LIMITED-REPLY SPRT

5.1 Purpose

The unlimited-look, limited-reply SPRT device (ULLR-SPRT) is designed to operate with an FI system that can provide an indeterminate number of sequences of replies for evaluation where each sequence contains N or fewer replies. For example, each sequence may be produced by a scan of the interrogator's antenna past the unknown to be identified and the number N of replies per scan may be determined by the interrogation repetition frequency and the antenna beam width and scanning rate. In this case a scan is synonomous with a look.

The ULLR-SPRT offers some advantages over the ULUR-SPRT described in Sec. 4.0. It makes the same decisions: (A), (R), and (U) in Mode 1 and (A) and ($\bar{A}$) in Mode 2, and these decisions satisfy precisely the same criteria as those made by the ULUR-SPRT. However, the ULLR uses the known limit on the maximum number of replies to be evaluated during each look (in each sequence) to provide an increase in the SPRT's capacity. In other words, the ULLR-SPRT can evaluate data from more unknowns in a given period of time than the ULUR-SPRT, because when it is used, no more than N interrogations need be sent to each unknown. And the upper limit N for the number of replies to be evaluated in each sequence may be chosen to match physical parameters such as the distance between an interrogator and the unknown (target) to be identified without affecting the ULLR-SPRT's ability to make valid decisions.

5.2 Description and Operation

FIG. 1D provides a detailed diagram of the unlimited-look, limited-reply sequential probability ratio test device (ULLR-SPRT), and FIG. 2D provides a simplified block diagram of it. Since all blocks except the output selector O-SEL1008 of FIG. 2D have already been discussed, and the operation of O-SEL1008 is not very complex, we can summarize operation of the ULLR-SPRT before going into the details of FIG. 1D.

For Mode 1 operation, S30 of the reply limiter REL1004 and S41 in the output selector O-SEL1008 must be set in their Mode 1 positions, thresholds $T_C$ and $T_B$ must be entered on inputs A and $B_1$, respectively, and outputs V, W, Y, and Z must be used. Operation then proceeds exactly as described for the ULUR-SPRT of Sec. 4.0 except that no more than N replies will be evaluated during each look. If no decision has been made earlier, when the reply limiter R-LIM 1004 determines that N replies have been evaluated, it sends a pulse via lead 537 to O-SEL1008, which then blocks the outputs to W and Z and causes the false droop eliminator FDE1006 to select the proper ratio for output V. If a trailing-edge pulse enters on G after N but before N+K replies have been received (following the leading-edge pulse), then the false-droop eliminator FDE1006 sends to output V (via O-SEL1008) the ratio product produced K reply evaluations prior to the arrival of the trailing-edge pulse. If no trailing-edge pulse enters on G by the time N+K replies have been received, then FDE1006 sends to output V the ratio product $R_{N,j}$ produced when the $N^{th}$ reply was evaluated. If a trailing-edge pulse arrives when N or fewer replies have been evaluated, then the ULLR-SPRT operates exactly the same as the ULUR-SPRT.

For Mode 2 operations, S30 and S41 must be set in their Mode 2 positions, the thresholds $T_C'$, $T_{B',1}$, $T_{B',2}$, ..., $T_{B',M}$ must be entered on inputs A, $B_1$, $B_2$, ..., $B_M$, respectively, and outputs W and X must be used. (Output X is the same as Z.)

When S30 of the reply limiter REL1004 is in its Mode 1 position, the threshold $T_B$ supplied to input $B_1$ is made available to the comparator COM1002 on lead 501. When S30 is in its Mode 2 position, the lower threshold corresponding to the number of replies evaluated is made available on lead 501. The use of this set of lower thresholds makes only a slight improvement in Mode 2 operation. Alternatively, a single lower threshold $T_B'$ may be used and then switch S30 may be eliminated (or wired in its Mode 1 position). How all of the thresholds discussed above should be selected is described in Ref. 3. Of course, when only two thresholds are used, T-REG1 may be used instead of T-REG1A. Note that lead 533 is shown as a dashed line in FIGS. 1D and 2D because it is needed only if S30 and T-REG1A are used.

FIG. 1D shows how the output selector O-SEL1007 accomplishes the functions described above.

Mode 1 Operation

In Mode 1 operation, whenever $$R_{n,j} \geq T_C \tag{15}$$

COM1002 produces a pulse on output 518. This pulse goes through AND44 if it occurs before the reply limiter R-LIM1004 has produced a pulse on lead 537; i.e., if it occurs when N or fewer replies have been evaluated. When the pulse on 518 goes through AND44, it goes to output W, thus indicating that an (A) decision has been made, and it also goes through OR37 to reset the SPRT. Note that the pulse from OR37 sets RS28 to prevent any later output on Z and also goes through OR42 to the reset bus of the ratio product determiner RPD1001. (This resetting process has been described in earlier sections of the application.) Whenever $$R_{n,j} \leq T_{B,n} \tag{16}$$

then COM1002 produces a pulse on its output 519. This pulse goes through AND45 if it occurs when N or fewer replies have been evaluated, and proceeds to set RS18. The setting of RS18 opens AND20 and AND48 and removes the voltage from one input to AND49. When AND 20 is opened, the delayed interrogation trigger pulses from Δ19 will pass through it and OR43 to K-CTR21. Thus, K-CTR21 will immediately start counting the replies that a trailing-edge detector might be using to determine when a trailing-edge pulse should be provided, and it will continue to count until either a trailing-edge pulse enters on G or it reaches a count of K. When K-CTR21 reaches a count of K following the pulse on 519 (from COM1002), COM22 will produce a pulse on 525 that will go through AND48 and S41 to output Y, thus indicating that an (R) decision has been made. The pulse on 525 will also go to AND49 but will be unable to pass because no voltage will be applied to either of its other two inputs; RS18 was set by the pulse from AND45 and RS47 still being in its reset position. Note that even if R-LIM1004 produces an output pulse on 537 before D-CTR21 reaches its count of K, there will be no change in the action just described concerning K-CTR21 and COM22. In this case, the setting of RS47 will open AND46 in parallel with the already open AND20, and AND49 will still remain closed because the outputs from RS18 will remain unchanged.

The pulse from AND48 through S41 will also go through OR37 to perform the same resetting action as that of a pulse on 550 from AND44, already described.

If the reply limiter R-LIM1004 determines that N replies have been evaluated before any output has been produced by COM1002, then the resulting pulse 537 will have major effects. It will close AND44 and AND45 so that there can be no output on W and RS18 cannot be set, and it will open AND46 so that delayed interrogation trigger pulses can pass through it and OR43 to K-CTR21. In that case, when K-CTR21 reaches a count of K, the resulting pulse from COM22 will find AND49 open and AND48 closed. Hence, it will go through AND49 and OR42 to the reset bus of RPD1001. Note that RS28 remains reset when this reset pulse goes to RPD1001. Hence, there will be a gating voltage applied via 529 to AND39, which as described in Sec. 4.0, will allow the ratio product produced K replies earlier (in this case $R_{N,j}$) to be sent to output V where it becomes the a priori probability ratio $R_{O,j+1}$ to be used for the next look at the same unknown. Also, as explained in Sec. 4.0, RPD1001 will produce a pulse on lead 511 shortly after the output on V is produced. The pulse on 511 will reset K-CTR21 and RS47 (RS18 will already be reset), and it will go through AND26 to provide an output pulse on Z, indicating that as far as this and all preceding looks are concerned this particular unknown (target) must remain unknown (U).

If a trailing-edge pulse enters on G before COM1002 produces an output on 518 and before K-CTR21 has reached a count of K (this includes the case where it has not started to count because there has been no output from COM1002 on 519 and no output from R-LIM1004 on 537), then this pulse causes the ratio product produced K reply evaluations earlier to be sent to output V and then produces a pulse at output Z as described in Sec. 4.0.

Mode 2 Operation

The effect of setting S30 to its Mode 2 position has already been described. Setting S41 to its Mode 2 position keeps any pulses from reaching output Y, and more important, causes any pulse that comes from AND48 to produce a new a priori ratio $R_{O,j+1}$ at output V plus a pulse on output X/Z to indicate that the $(\bar{A})$ decision has been made. The Z and X outputs are identical for the ULLR-SPRT. Both are provided so that all SPRTs to be used with a FI system will have similar outputs.

The action of a pulse from AND48 on lead 556 performs the same functions as one on lead 557 from AND49, which has already been described. This is appropriate for Mode 2 operation, since failure to achieve an (A) decision due to a low ratio product is supposed to have the same effect as failure to achieve one because the look was ended before either threshold was crossed.

5.3 Summary of ULLR-SPRT Functions

The ULLR-SPRT extends the techniques offered by the ULUR-SPRT to situations in which a fixed upper limit on the number of replies to be evaluated during each look is prescribed. Many existing reply evaluators place such a limit on replies for the dual purpose of (a) keeping the total number of interrogations and replies to a minimum and thus keeping mutual interference low, and (b) making it more difficult for an enemy to spoof, i.e., appear as a friend, where existing reply evaluators are used. The SPRT, if used properly, can easily remove the need for limiting the number of replies to prevent spoofing, but the SPRT can, just as other decision devices, take advantage of advance knowledge concerning the number of replies to be evaluated.

Since the ULLR-SPRT places no limit on the number of looks, this particular version of the SPRT cannot be as efficient as the succeeding SPRTs which do.

6.0 LIMITED-LOOK, UNLIMITED-REPLY SPRT

6.1 Purpose

The limited-look, unlimited-reply SPRT device (LLUR-SPRT) is designed to operate with a FI system in which no more than a predetermined number L of looks can be taken at each unknown to be identified, but no upper limit is placed on the number of replies that may be obtained during each look. If the FI uses a directive scanning interrogator antenna, then each scan of the antenna past the unknown constitutes a "look." The number of replies per look should be the same as the number of interrogations transmitted. Hence, if no controls are placed or either the antenna scanning rate or the interrogation repetition frequency, then the number of replies per look may be considered as an arbitrary or "unlimited" number.

The LLUR-SPRT is similar to the preceding SPRTs described in that it makes the (A), (R), or (U) decision in its Mode 1 and the (A) or $(\bar{A})$ decision in its Model 2 operation. However, since the maximum number of looks L is known in advance, the LLUR-SPRT thresholds can be so selected than an "unknown" decision in Mode 1 after the last ($L^{th}$) look will be essentially equivalent to an (R) decision. This unknown decision after the $L^{th}$ look is denoted ($U_L$). Similarly, in Mode 2, the $(\bar{A})$ decision after the $L^{th}$ look is denoted ($\bar{A}_L$), and it provides a stronger indication of non-acceptability than the $(\bar{A})$ decision provided at the end of any earlier look. Reference 3 describes how thresholds for the LLUR-SPRT may be chosen to produce these types of outputs.

6.2 Description and Operation

FIG. 2E provides a simplified block diagram of the LLUR-SPRT. In this figure, the threshold register T-REG1, the ratio product determiner RPD1001, and the comparator COM1002 are the same as those shown in FIG. 1A(Sec. 2.0). The look limiter L-LIM1011 counts the number of looks and provides a pulse on lead 564 at the start of the $L^{th}$ look taken at each unknown. Output ratio selector ORS1009 performs the functions of the false droop eliminator FDE1006, as shown in FIG. 1C (Sec. 4.0), to eliminate the effect of low-reliability replies that occur near the trailing edge of the interrogation antenna's beam, and in addition, it compares the new ratio product produced during each look with the a priori ratio used for the look. The larger of these two ratios is made available to output selector O-SEL1010 via lead 558. If neither an (A) nor an (R) decision has been made when any of the first L−1 looks at an unknown ends, then OSEL1010 allows the ratio provided by ORS1009 to pass through to output V where it becomes the a priori probability ratio $R_{o,j+1}$ to be used for the next look at the same unknown. O-SEL1010 does not permit any output on V during or at the end of the $L^{th}$ look at an unknown. Instead, if neither the (A) nor the (R) decision has been made when the $L^{th}$ look ends, then O-SEL1010 causes a pulse to appear at outputs $Z_L$ (for Mode 1) and $X_L$ (for Mode 2).

The (A) and (R) decisions of the LLUR-SPRT are made in very much the same manner as they are made by the SPRTs described earlier, but a different set of thresholds, selected in accordance with the formulas developed in Ref. 3, must be used for the LLUR-SPRT.

Figure 1E:
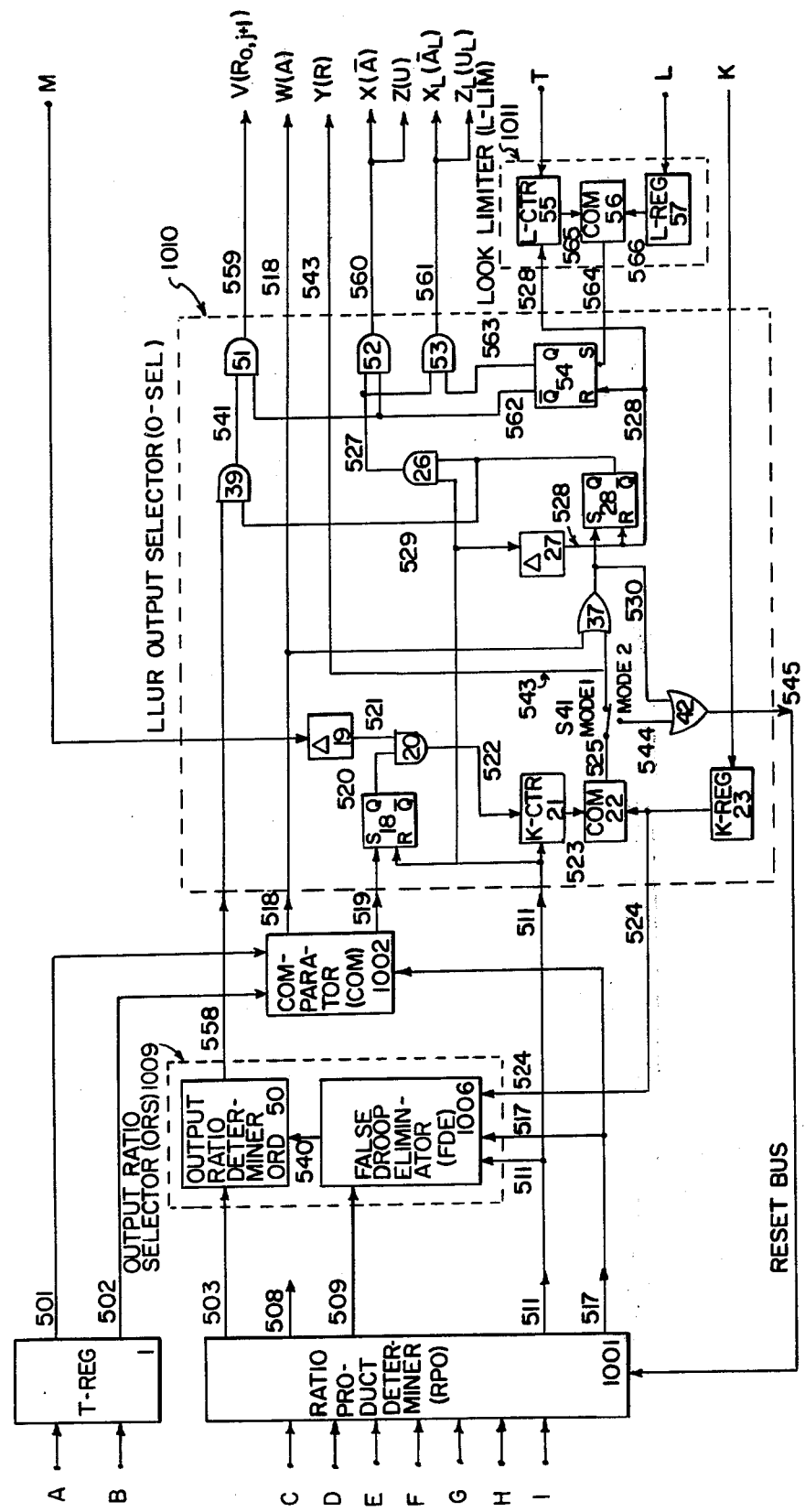
FIG. 1E is a schematic of a limited-look unlimited reply SPRT device (LLUR-SPRT).

FIG. 1E provides a detailed diagram showing how those items not already fully discussed perform their functions.

Prior to operation of the LLUR-SPRT, the number L, representing the maximum number of looks allowed in identifying each unknown, is fed via input L to look register L-REG57. The FI system provides a pulse on input T each time a look at a particular unknown starts. The look counter L-CTR55 counts the pulses entering on T and when it reaches a count of L, the comparator COM56 produces an output on 564. The look limiter L-LIM1011 which is composed of L-CTR55, COM56, and L-REG57 may be included as part of an FI systems data processor if the system uses a scanning interrogator antenna. Those systems that do not use a scanning interrogator antenna must be equipped with a separate look limiter of the type shown in FIG. 1E.

Output ratio determiner ORD50 is a special type of comparator. It receives the a priori probability ratio $R_{O,j}$ on lead 503 from RPD1001 at the start of each look, and it receives a new probability ratio $R_{n,j}$ from FDE1006 at the end of each look. (See Secs. 2.0 and 4.0 and FIGS. 1A and 1C for further details.) Each new ratio product received from FDE1006 is compared with the stored a priori ratio product, and the larger of the two is sent via lead 558 to AND39 of O-SEL1010. AND39 will be open when this ratio arrives unless an (A) or an (R) decision (of Mode 1) or an (A) decision (of Mode 2) has been made.

Gate AND51 will be open only during any of the first $L-1$ looks at an unknown. Thus, the ratio selected by ORS1009 will go to output V during any of the first $L-1$ looks at an unknown if no final decision is made during these looks. Otherwise, there will be no output on V.

This process of always starting each new look at an unknown with an a priori probability ratio that is at least as large as the one used for the immediately preceding look at the same unknown permits the LLUR-SPRT to identify friends who experience bursts of low-reliability replies due to antenna shadowing or interference. Reference 3 describes how the thresholds can be selected so the required criteria will be satisfied when this method of improving friend-identification capability is used.

Mode 1 Operation

For Mode 1 operation, the thresholds $T_C$ and $T_B$ must be entered on inputs A and $B_1$, respectively, and S41 must be in its Mode 1 position. Whenever $$R_{n,j} \geq T_C \qquad (15)$$

a pulse appears on output 518 of COM1002. This pulse goes to output W to provide the (A) indication, and it goes through OR37 to set RS28 and on through OR42 to reset the device. Note that the setting of RS28 closes AND26 and AND39. Thus, the pulse which appears on 511 a few microseconds later (see Sec. 2.0) will be unable to pass AND26, and the ratio selected by ORD50 will be unable to pass AND39. The pulse on 511 will, however to able to reset RS28, RS54, and L-CTR55 after the delay produced by $\Delta 27$.

Whenever $$R_{n,j} \leq T_{B,n} \qquad (16)$$

a pulse appears on output 519 of COM1002. This sets RS18 and thus opens AND20 so that delayed interrogation trigger pulses from $\Delta 19$ can pass to K-CRT21 which immediately starts counting them. If a trailing-edge pulse enters on G before K-CTR21 reaches a count of K, the counting will be stopped by the resetting action that follows. Otherwise, when K-CTR21 reaches a count of K, COM22 will produce a pulse on lead 525. This pulse goes through S41 to output Y, thus indicating that the reject (R) decision has been made, and it also goes through OR37 to reset the device (as described for the pulse on 518).

If a trailing-edge pulse enters on G before K-CTR21 reaches a count of K, it will immediately cause FDE1006 to send the ratio product produced K reply evaluations earlier to ORD50, and ORD50 will then send either this new ratio or the a priori ratio, whichever is larger, to AND39.

Since AND39 will always be open unless either an (A) or an (R) decision has already been made, the ratio provided by ORD50 will go to AND51. During the first $L-1$ looks at an unknown, RS54 will remain in the reset position and hence AND51 will be open. Thus, the ratio selected by ORD50 will go to output V at the end of each of the first $L-1$ looks in which neither the (A) nor the (R) decision is made. When $L^{th}$ look starts, however, the pulse from COM56 on 564 will set RS54 and thus close AND51 so that in this case there can be no output on V. The setting of RS54 alo closes AND52 and opens AND53 so that any output from AND26 during the $L^{th}$ look will go to outputs $X_L$ and $Z_L$ instead of outputs X and V. Note that there will be an output from AND26 if and only if a pulse appears on 511 from RPD1001 (indicating the end of the look) before either the (A) or the (R) decision has been made.

The extra outputs $X_L$ and $Z_L$ of FIG. 1E are redundant in the sense that the information they carry could be provided by an output on X and Z when no output is present on V, but these extra outputs, as well as having parallel outputs on X/Z and $X_L/Z_L$ will be convenient for device interconnections to be discussed later.

Mode 2 Operation

For Mode 2 operation, thresholds $T'_C$ and $T'_B$ must be entered in place of thresholds $T_C$ and $T_B$, and S41 must be in its Mode 2 position. Operation of the LLUR-SPRT is then the same as for Mode 1 except that there can never be an output on Y. Instead, each time COM22 reaches a count of K, the pulse on 525 goes directly through OR42 to reset the device and produce appropriate outputs on X/Z and V during the first $L-1$ looks or produce only an output on $X_L/Z_L$ during the $L^{th}$ look at an unknown.

6.3 Summary of LLUR-SPRT Functions

The LLUR-SPRT uses the same type of simple, reliable circuitry to make its decisions as the other SPRTs described. And it eliminates the effect of trailing-edge droop in the same manner. Its (A) and (R) decisions will satisfy the same criteria as those of the other SPRTs described. However, since the LLUR-SPRT makes use of advance knownledge concerning the maximum number of looks to be taken at each unknown to give an advantage to friends, the LLUR-SPRT can be considerably more effective in making (A) decisions concerning friends than the other device described thus far. Also, the LLUR-SPRT provides two different types of unknown (U) and ($\overline{A}$) decisions. Those made after any of the first $L-1$ looks at each unknown are the same as corresponding decisions made by the devices described earlier, but those made after the last (or $L^{th}$) look at an unknown can be significantly more meaningful in some situations e.g. when certain types of interferences are not present.

In both modes of operation, the LLUR-SPRT favors friends by always starting each look at an unknown with an a priori ratio that is greater than or equal to the value used for the last previous look at the same unknown. This precedure provides an entirely new way of increasing the discrimination between friends and non-friends, for although it is very helpful to friends, it gives only a completely negligible advantage to non-friends.

The techniques used by the LLUR-SPRT can also be applied in the evaluation of statistical data from many sources other than an FI system which has been used here for illustrative purposes.

7.0 LIMITED-LOOK, LIMITED-REPLY SPRT

7.1 Purpose

The limited-look, limited-reply SPRT device (LLLR-SPRT) is designed to operate with an FI system in which both the number of looks to be taken at an unknown and the number of replies possible during each look are limited. For convenience, L is taken as the maximum number of looks and N as the maximum number of replies per look.

In its Mode 1 operation, the LLLR-SPRT provides (A) or (R) decisions whenever the replies received warrant such decisions, and it provides the unknown ($U_L$) decision when neither (A) nor (R) can be made after all L looks have been taken. This mode of operation is not safe to use with an FI system unless auxiliary means are available for making certain that the distribution of errors in friends' replies is relatively uniform.

In its Mode 2 operation, the SLLR-SPRT makes the (A) decision whenever the replies warrant it, and the ($\overline{A}_L$) decision if the (A) decision cannot be made by the time L looks have been taken. This mode is especially effective when used with an FI system of the type now in use, because such systems need to place limits on the number of looks and the number of replies per look in order to prevent mutual interference and increase reliability. When used with these systems, the LLLR-SPRT can make valid decisions based on data that would produce no decisions if used by existing and most proposed decision devices.

7.2 Description and Operation

Figure 1F:
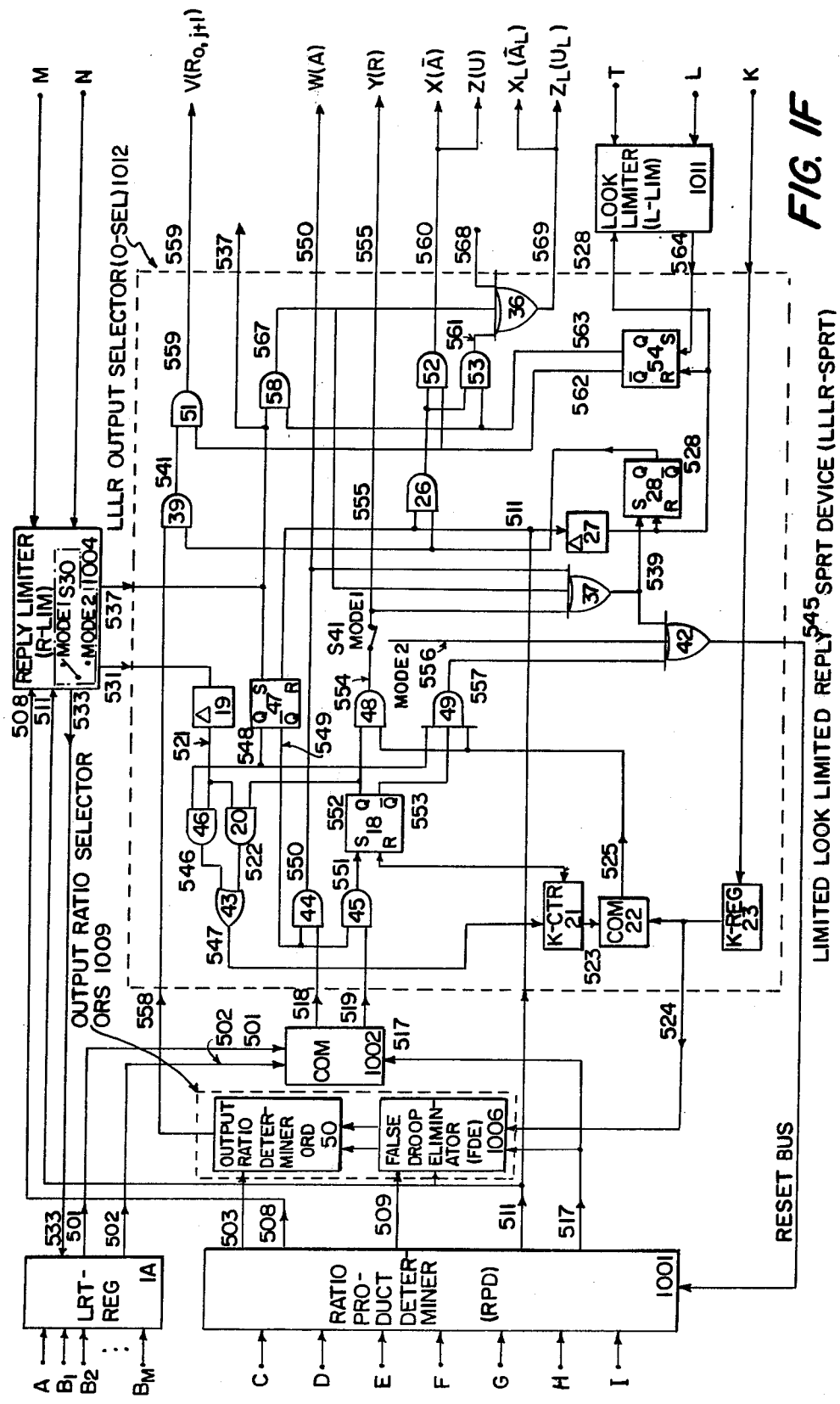
FIG. 1F is a schematic of a limited-look limited reply SPRT device (LLLR-SPRT).

All of the operations performed by the LLLR-SPRT have already been described in connection with one or more of the SPRTs discussed earlier. However, the interconnections of parts are necessarily different for the LLLR-SPRT. FIG. 1F shows full details of how the elements should be connected to perform the LLLR-SPRT functions, and FIG. 2F provides a simplified block diagram of the device.

The numbers N and L, as well as K and the thresholds, must be entered before operation of the LLLR-SPRT starts, and they remain fixed unless there is a change in parameters of the FI system (e.g., antenna characteristics, antenna scanning rate, interrogation repetition rate, or time available for making decisions). The thresholds $T_C$ and $T_{B,1}$ are required for Mode 1 operation, and switches S30 (part of the reply limiter R-LIM1004) and S41 (in the output selector O-SEL1012) must be in their Mode 1 positions. The set of thresholds $T_C'$ and $T_{B',1}, T_{B',2}, \ldots, T_{B',M}$ are needed for Mode 2 operation, and both switches must be set to "Mode 2." Reference 3 describes how all thresholds are to be determined and also gives a detailed description of Mode 2 operation which is called the "Sequential Probability Ratio Friend Identification Test (SPRFIT)." Numerical examples illustrating how this SPRFIT(i.e., Mode 2) will work are also provided in Ref. 3.

The LLLR-SPRT actually can make a total of six different decisions as it processes replies, if both modes are considered. These decisions are as follows:

(1) The (A) decision, which can be made in either mode of operation during any of the L looks.

(2) The (R) decision, which can be made only in Mode 1 operation, but can be made during any look.

(3) The unknown (U) decision, which occurs in Mode 1 operation at the end of each of the first L−1 looks at an unknown if neither the (A) nor the (R) decision has been made before the look ends. This decision is always accompanied by an a priori ratio (on output V) to be used for the next look at the same unknown. For any look j the new a priori ratio $R_{O,j+1}$ is always equal to or greater than the a priori ratio $R_{O,j}$ used for the $j^{th}$ look; i.e., $$R_{O,j+1} \geq R_{O,j}. \tag{19}$$

(4) The ($\overline{A}$) decision, which occurs in Mode 2 operation at the end of each of the first L−1 looks at an unknown if the (A) decision has not been made before the look ends. This decision is also always accompanied by a new a priori product $R_{O,j+1}$ such that (19) is satisfied.

(5) The "final unknown" decision ($U_L$), which occurs in Mode 1 operation at the end of the $L^{th}$ look at an unknown if neither the (A) nor the (R) decision has been made by that time.

(6) The "final unacceptable" decision ($\overline{A}_L$), which occurs in Mode 2 operation at the end of the $L^{th}$ look at an unknown if the (A) decision has not been made by that time. Since pulses indicating a (U) decision and pulses indicating an ($\overline{A}$) decision emanate from the same circuit element in the LLLR-SPRT, only a single output lead for the two is needed (FIG. 1F shows two leads so that its outputs will match those of earlier figures; FIG. 2F shows only one). Similarly, the ($U_L$) and ($\overline{A}_L$) outputs are identical. It must be remembered, however, that the different thresholds used for the two modes and the different switch setting will mean that, although the same output leads may be used for both modes, the outputs on these leads are not the same for both modes.

No further explanation should be needed concerning the simplified block diagram of FIG. 2F. Its blocks merely accomplish the functions just described.

Since all of the items and leads of FIG. 1F are numbered to correspond with earlier figures, their operation can be derived from earlier explanations. However, a brief summary of the operations performed will be given here, and how these operations correspond to the mathematical derivations of Ref. 3 will be provided.

(1) How the accept (A) decision is made (Mode 1 or Mode 2) —

Whenever the ratio product $R_{n,j}$ (produced by RPD1001 after the $n^{th}$ reply of the $j^{th}$ look) becomes such that $R_{n,j}$ is equal to or greater than the accept threshold $T_C$ for Mode 1 or $T_C'$ for Mode 2 after N or fewer replies have been evaluated during any of the L looks, the (A) decision must be made. The manner is which accept decisions are made may thus be represented concisely by the following expression.

①(A) Mode 1 or Mode 2

For any $j \leq L$ and $n \leq N$, where j, L, N, n are integers,
if $R_{n,j} \geq T_C$, then (A) is on output W for Mode 1 (20)
and if $R_{n,j} \geq T_C'$, then (A) is on output W for Mode 2. (21)

In FIG. 1F, COM1002 will produce a pulse on 518 each time $R_{n,j} \geq T_C$ for Mode 1 and each time $R_{n,j} \geq T_C'$ for Mode 2. If this occurs then N or fewer replies have been evaluated, there will have been no output from R-LIM1004 on 537; so AND44 will be open. Thus, the output on 518 will go through AND44 and then directly to output W for the required (A) indication. The pluse from AND44 will also go through OR37 to reset the device without allowing an output to appear on V because AND39 will be closed. (See Sec. 5.0 for further details).

(2) How the reject (R) decision is made (Mode 1 only) — In Mode 1 operation, whenever the ratio product $R_{n,j}$ becomes such that $R_{n,j}$ is equal to or less than $T_B$ after N or fewer replies have been evaluated during any of the L looks and a trailing-edge pulse does not enter on input G after receipt of the next K replies following the reply which made $R_{n,j} \leq T_B$, then the (R) decision must be made. This process may be represented by the following expression.

②(R) Mode 1 only

For any $j \leq L$ and $n \leq N \leq m - K$, where j, K, L, m, and n are integers,
if $R_{n,j} \leq T_B$, then (R) is on output Y, (22)

where m is the number of replies evaluated during the $j^{th}$ look between the time that a leading-edge pulse starts the evaluation process and a trailing-edge pulse occurs.

In FIG. 1F, COM1002 will produce a pulse on 519 whenever $R_{n,j} \leq T_B$. If N or fewer replies have been evaluated when this pulse is produced, it will go through AND45 to set RS18, thus opening AND20 and AND48. When AND20 is opened, K-CTR21 immediately starts counting the delayed interrogation trigger pulses present on lead 521. If no trailing-edge pulse occurs before K-CTR21 reaches a count of K, i.e., if $n + K \leq m$, COM22 will produce a pulse on 525 just K reply evaluations after the pulse appeared on 519. This pulse will go through AND48 and S41 to output Y to produce the required (R) indication. It will also go through OR37 to reset the device without allowing an output to appear on V. If a trailing-edge pulse occurs before a count of K is reached, a (U) or ($U_L$) decision results. (See next subsection).

(3) How the unknown (U) decision is made (Mode 1 only)

In Mode 1 operation, the (U) decision must be made whenever any of the first $L-1$ looks ends if neither the (A) not the (R) decision has been made by that time. And, each time a (U) decision is made, the appropriate new a priori ratio must appear at output V. A look may be terminated by the arrival of a trailing-edge pulse on input G or by a pulse on lead 537 from R-LIM1004, which occurs when a total of N replies has been evaluated in the look. Since the count of N interrogation triggers, which produces the output of 537, may occur after reply reliability has been reduced sowewhat by the trailing-edge droop produced as the interrogator's antenna starts to move away from the unknown and yet before a trailing-edge pulse has been produced, the device must wait until K more replies have been evaluated after the count of N has been reached before selecting a ratio product for output V, unless a trailing-edge pulse enters before K more replies can be evaluated.

Thus, each time a trailing-edge pulse enters on G, say after the $m^{th}$ reply has been evaluated, the output ratio selector ORS1009 can immediately compare the ratio product produced K replies earlier ($R_{m-K,j}$) with the a priori ratio $R_{O,j}$, and send the larger of the two to output V. Only after this is done, does RPD1001 allow a pulse on 511 to produce the required (U) output on Z and then reset the device. The pulse on 511 goes through AND26 and AND52 to reach output Z. The only restrictions on m, the reply number associated with the trailing-edge pulse, is that it must occur before $N + K$ replies have been evaluated, or the device will have already been reset in the manner described below. During any of the first $L-1$ looks, when N replies following a leading-edge pulse on input F have been evaluated and neither an (A) no an (R) decision has been made, the pulse which R-LIM1004 produces on 537 sets RS47 and thus opens AND46 and AND49 (RS18 will still be reset and AND58 will be closed) and closes AND44 and AND45. This action will keep any later outputs from COM1002 from having any effect, and it will allow COM22 to produce an output on 525 K replies later, provided that a trailing-edge does not occur first. The pulse on 525, produced when $N + K$ replies have been received, will go through AND49 and OR42 to the reset bus of RPD1001. It will thus cause the ratio product $R_{N,j}$, produced after the $N^{th}$ reply was evaluated, to be compared with $R_{O,j}$ and the larger of the two to be sent to output V. When this action has been completed, RPD1001 will cause a pulse to appear at output Z and reset the device. Note: The output 537 and the input 568 in FIG. 1F are needed only for the General Purpose SPRT which is described in Sec. 8.0.

All of the above action may be represented concisely by the expressions:

③(U) Mode 1 only

For any $j < L$, where j, K, L, m, N, and n are integers,
(a) If $T_B < R_{n,j} < T_C$ for all $n \leq m - K < N$, then $$\max\begin{Bmatrix} R_{O,j} \\ R_{m-k,j} \end{Bmatrix} = R_{O,j+1} \text{ on output } V \text{ and } (U) \text{ on output } Z \quad (23)$$

or (b) If $T_B < R_{N,J} < T_C$ for any $N \leq m - K$, then $$\max\begin{Bmatrix} R_{O,j} \\ R_{N,j} \end{Bmatrix} = R_{O,j+1} \text{ on output } V \text{ and } (U) \text{ on output } Z. \quad (24)$$

(4) How the not acceptable ($\bar{A}$) decision is made (Mode 2 only)

In Mode 2 operation, the ($\bar{A}$) decision must be made whenever any of the first $L-1$ looks ends if the (A) decision has not been made by that time. If COM1002 produces no output on 519 (i.e., if $R_{n,j} > T'_{B,n}$ for all n), then outputs on V and X are produced for Mode 2 in the same manner as output on V and Z, respectively, are produced for Mode 1. However, if COM1002 produces an output on 519 before either a trailing-edge pulse enters on G or N replies have been evaluated, this means that the look should be terminated because the ratio produce has fallen hopelessly low, but it does not produce an (R) decision.

The pulse that COM1002 produces on 519, say, after the $n^{th}$ reply will go through AND45 to set RS18 if there has been no earlier input on 537 from R-LIM1004. This action will allow T-CTR21 to count delayed interrogation triggers just as for Mode 1, and COM22 will produce an output on 525 when a count of K is reached. (A trailing-edge pulse can stop this count at any time and produce the proper outputs on V and X.) When a pulse is produced on 525, it will go through AND48, S41 (which is in its Mode 2 position) and OR42 to the reset bus of RPD1001. It wil thus cause ORS1009 to compare $R_{n,j}$, the ratio product that caused a pulse on 519, with $R_{Oj}$ and send the larger of the two to output V. It will then cause a pulse to appear at output X, thus indicating that the $(\bar{A})$ decision has been made. Since, in this case $$R_{n,j} \leq T_{B,n} \tag{12}$$

the output on V will always be $R_{Oj}$, i.e. If the look is terminated due to an output on 519, then the next look will be started with the a priori ratio used for the look being terminated. Or briefly $$R_{Oj+1} = R_{Oj} \tag{25}$$

The procedure of making an $(\bar{A})$ decision, where j, K, L, M, and n are integers may be expressed as follows:

[4]($\bar{A}$) Mode 2 only

For any $j < L$, (a) if $T'_B < R_{n,j} < T'_C$ for all $n < m-K < N$, then $$\max\left\{\begin{array}{c} R_{Oj} \\ R_{m-K,j} \end{array}\right\} = R_{Oj+1} \text{ on output } V \tag{26}$$

and $(\bar{A})$ on output X or (b) if $T_B < R_{N,j} < T_C$ for any $N \leq m-K$, then $$\max\left\{\begin{array}{c} R_{Oj} \\ R_{N,j} \end{array}\right\} = R_{Oj+1} \text{ on output } V \tag{27}$$

and $(\bar{A})$ on output X or (c) if $R_{n,j} < T_{B,n}$ for any $n \leq N \leq m-K$, then $R_{Oj} = R_{Oj+1}$, on outut V and $(\bar{A})$ on output X. (28)

(5) How the final unknown $(U_L)$ decision is made (Mode 1 only)

In Mode 1 operation, if neither the (A) nor the (R) decision has been made by the time the last $(L^{th})$ look is terminated due to either a trailing-edge pulse of a pulse from R-LIM1004 indicating that N replies have been evaluated, the final unknown decision $(U_L)$ must be made. During the $L^{th}$ look, all operations are the same as described for earlier looks except for the action produced by the pulse that the look limiter L-LIM1011 produces on 564 at the start of the $L^{th}$ look. This pulse sets RS54, thus opening AND53 and AND58 and closing AND52 and AND51. This action prevents anything from reaching output V and causes the pulse that would go to output Z due to the arrival of a trailing-edge pulse during any of the first $L-1$ looks to go to output $Z_L$ instead. Since no output appears at V, there is no need to wait until $N + K$ replies have been received to produce the output on $Z_L$ following receipt of N replies that fail to produce a decision. For this reason, the pulse on 537 is allowed to go directly through AND58 and OR36 to output $Z_L$, and it also goes from AND58 to OR37. Thus it immediately produces the $(Z_L)$ decision and resets the device without allowing an output on V. The method of making the $(U_L)$ decision, may be expressed as follows:

[5]($U_L$) Mode 1 only

If $T_B < R_{n,j} < T_C$ for all $j < L$ and $n < N$, and (a) $R_{n,L} < T_B$ for any $n \leq N-1$, or (b) $R_{n,L} < T_C$ for all n and any m such that $n \leq m \leq n$, or (c) $R_{N,L} < T_C$ for any $N < m$, then $(U_L)$ pulse is on output Z.

(6) How the final not acceptable decision $(\bar{A}_L)$ is made

In Mode 2 operation, the look limiter performs exactly the same functions as in Mode 1 to keep any outputs from reaching V and to transfer the outputs from X to $X_L$. The method of making the $(\bar{A}_L)$ decision may be expressed as follows

[6]($\bar{A}_L$) Mode 2 only

If $T'_{B,n} < R_{N,j} < T'_C$ for all $j < L$ and $n \leq N$, and (a) $R_{n,L} < T'_{B,n}$ for any $n \leq N-1$, or (b) $R_{n,L} < T'_C$ for all $n \leq m \leq N$, or (c) $R_{n,L} < T'_C$ for all $n \leq N \leq m$, then $(\bar{A}_L)$ pulse is on output $X_L$. (30)

7.3 Summary of LLLR-SPRT Functions

The LLLR-SPRT uses the same simple, reliable circuitry as the SPRTs described earlier. In its Mode 1 operation, it provides (A), (R), and $(U_L)$ decisions concerning L or fewer sequences of N replies each, such that the prescribed criteria ($\alpha$, $\beta$) will be satisfied, and in doing so gives each friend a better chance of being accepted as such than he would have if the conventional SPRT were used.

In its Mode 2 operation, the LLLR-SPRT still further increases the friend's chance of being accepted without increasing except by a trivial amount the chance that an enemy will be accepted as a friend.

The mechanism for increasing the friend's chance of acceptance is that of first eliminating the effect of trailing-edge droop and then using for each new look at an unknown either the ratio product produced at the end of the last previous look at him (before trailing-edge droop set in) or the a priori ratio used for the last look, whichever is larger. Thus, the a priori probability ratio used for successive looks at each unknown is monotonically increasing in the LLLR-SPRT.

Full advantage is taken in the LLLR-SPRT of advance knowledge concerning the number of looks to be taken at each unknown and the number of replies to be evaluated during each look, to keep the upper threshold $T_C$ as low as possible, and thus further increase the friend's chance of acceptance. It should be noted, in particular, that the LLLR-SPRT is especially effective when used with an FI system in which the interrogator's antenna is scanning, for in such a system, one or more of the L scans very often occurs when a portion of the friendly aircraft interferes with reliable transmission of signals between the interrogator and transponder. If a reasonably high transmission reliability is achieved on only one of the L looks at a friend, the LLLR-SPRT will make the (A) decision. Reference 3 explains in detail why this is true.

8.0 GENERAL PURPOSE SPRT

8.1 Purpose

The general purpose (GP) sequential probability ratio test (SPRT) device includes all of the features of the six SPRTs described thus far, and is a convenient way of switching from one type and mode of operation to any other. In other words, any of the 12 modes of operation can be provided by the GP-SPRT by the proper setting of seven 2 position switches. Alternatively, the six different types of operation may be selected by a 6 position switch and the choice of Mode 1 and Mode 2 can then be made by a 2 position switch.

8.2 Description and Operation

Figure 10:
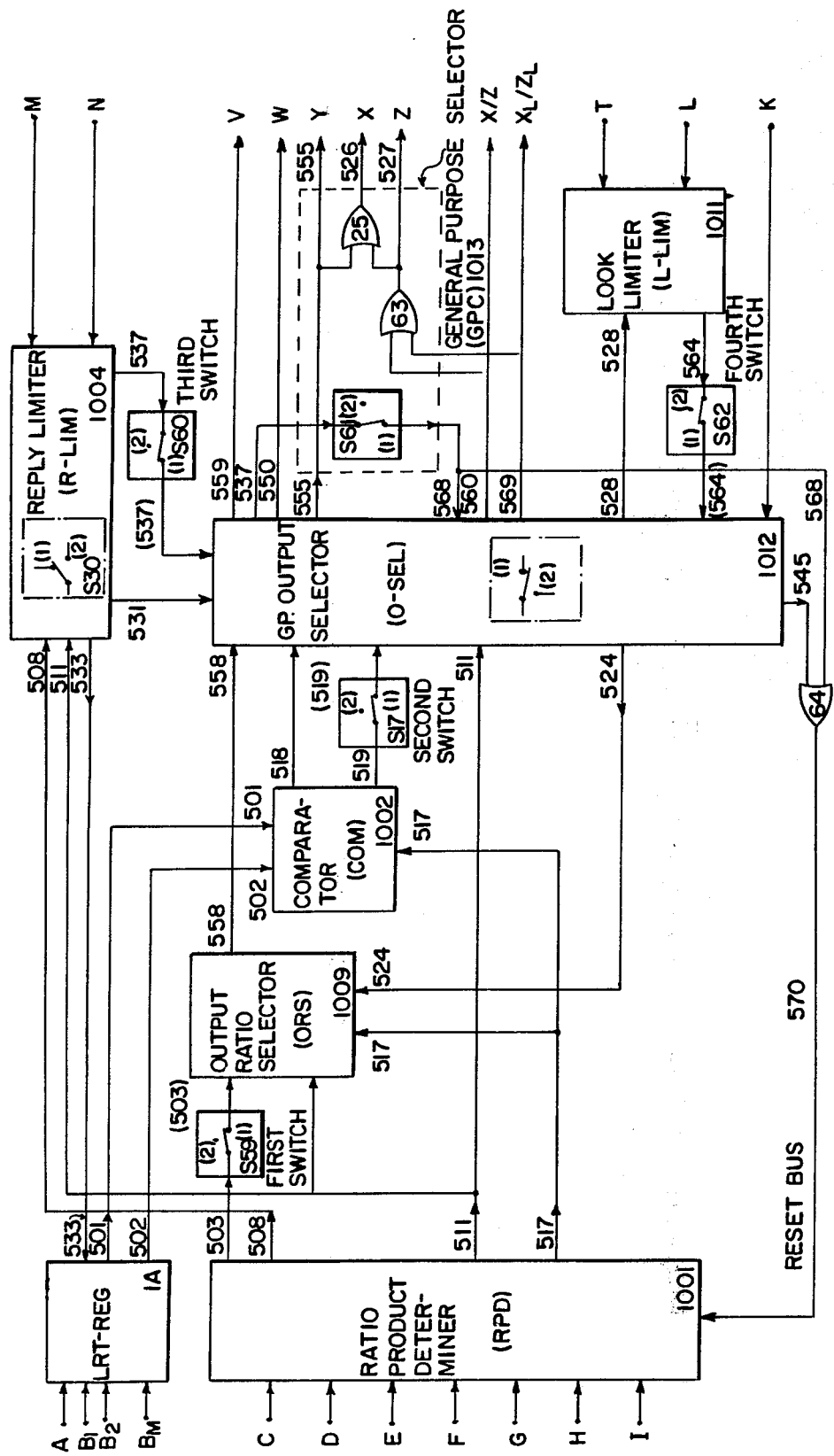
FIG. 10 shows the general purpose SPRT device GP-SPRT.

FIG. 10 shows how the units described in earlier sections can be interconnected to provide any of the 12 modes of operation by simply setting 7 switches properly. Three of these switches (S17, S30, and S41) have already been discussed in connection with one or more of the SPRTs. The others (S59, S60, S61, and S62) and OR63 are needed only for the GP-SPRT.

The components OR63, AND25, and S61 make up the new unit, general purpose connector GPC1013, which assures proper outputs on X, Y and Z.

The functions of each switch may be summarized as follows

S17: This switch is used only in Mode 2 of the SLUR-SPRT (see FIG. 1A) and is optional even in this case. It may thus be left in its position 1 at all times, or, if the slightly more rapid (A) decision capability that it provides for Mode 2 is desired, then it should be set to position 2 for Mode 2 of the SLUR-SPRT and left in position 1 otherwise.

S30: This switch appears first in FIG. 1B. When S30 is in position 1, it causes the number "one" to be sent via 533 to the limited-reply threshold register LTR-REG1A and thus makes LRT-REG1A perform exactly the same functions as T-REG1. Thus, S30 must be in position 1 for Mode 1 operation of all SPRTs and for both modes of the SLUR, ULUR, and the LLUR SPRTs. It must be in position 2 for Mode 2 operation of the SLLR, ULLR, and LLLR-SPRTs.

S41: This switch first appears in FIG. 1C where it allows (R) pulses to appear on output Y when in position 1 and prevents any such outputs when in position 2. It thus must always be in position 1 for Mode 1. When in position 2, S41 causes the appropriate ratio product obtained during any of the first $L-1$ looks at an unknown to be sent to output V for use as the a priori ratio for the next look at the same unknown. Since the SLUR and the SLLR-SPRTs evaluate data from only a single look at each unknown, S41 should remain in position 1 for them regardless of which mode of operation is being used. It must be in position 2 for Mode 2 operation of the ULUR, ULLR, LLUR, and LLLR-SPRTs.

S59: When this switch is in position 1, it connects lead 503, which carries the a priori ratio $R_{Oj}$ (see FIG. 1A), from RPD1001 to ORS1009. Thus, S59 must be in position 1 for the LLUR and LLLR-SPRTs only, and it must be in this position for both modes of their operation.

S60: When this switch is in position 1, it connects lead 537, which carries a pulse from R-LIM2004 to O-SEL1012 each time (in any look) that N replies have been evaluated. Since these pulses are needed by SLLR, ULLR, and LLLR-SPRTs in both modes of operation, S60 must be in position 1 for each of these SPRTs, and in position 2 otherwise.

S61: When this switch is in position 1, it permits any pulse on lead 537 to bypass AND58 (see FIG. 1F) and thus go via 568 directly through OR36 to output 569 of O-SEL1012 and also through OR64 to the reset bus of RPD1001. The SLLR-SPRT is the only device that requires this action; so S61 must be in position 1 only for it.

S62: When this switch is in position 1, it connects lead 564, which carries a pulse when the $L^{th}$ look at any unknown starts, from L-LIM1011 to O-SEL1012. Only the LLUR and LLLR-SPRTs require this action so S61 must be in position 1 for them only.

Table 1 shows how the seven 2-position switches of FIG. 10 should be set to obtain each of the 12 different types modes of SPRT operation that are possible.

Table I

| | SPRT Device | | | | | |
|---|---|---|---|---|---|---|
| Switch No. | (A) SLUR | (B) SLLR | (C) ULUR | (D) ULLR | (E) LLUR | (F) LLLR |
| Mode 1 | | | | | | |
| S17 | 1 | 1 | 1 | 1 | 1 | 1 |
| S30 | 1 | 1 | 1 | 1 | 1 | 1 |
| S41 | 1 | 1 | 1 | 1 | 1 | 1 |
| S59 | 2 | 2 | 2 | 2 | 1 | 1 |
| S60 | 2 | 1 | 2 | 1 | 2 | 1 |
| S61 | 2 | 1 | 2 | 2 | 2 | 2 |
| S62 | 2 | 2 | 2 | 2 | 1 | 1 |
| Mode 2 | | | | | | |
| S17 | (1or2) | 1 | 1 | 1 | 1 | 1 |
| S30 | 1 | 2 | 1 | 2 | 1 | 2 |
| S41 | 1 | 1 | 2 | 2 | 2 | 2 |
| S59 | 2 | 2 | 2 | 2 | 1 | 1 |
| S60 | 2 | 1 | 2 | 1 | 2 | 1 |
| S61 | 2 | 1 | 2 | 2 | 2 | 2 |
| S62 | 2 | 2 | 2 | 2 | 1 | 1 |

SWITCH SETTINGS FOR SPRT AND MODE SELECTION IN GP-SPRT

If each of the seven switches is replaced by a logic gate or gates then these gates may be opened and closed by setting the two switches of FIG. 11. The voltage source in FIG. 11 is connected to the apropriate AND gates via the mode selector switch S2 and the SPRT-selector switch S1. FIG. 12 shows the logic gates needed.

It now becomes clear why both outputs X and Z were maintained in some of the earlier figures, even though the same output was connected to both. This unusual choice of output connections permits a single device to provide all six types of SPRT operation in either mode, without changing either input or output connections. The switches provide all required changes by disabling any unneeded input or output.

8.3 Summary of GP-SPRT Functions

The GP-SPRT is capable of performing the functions of any of the six SPRTs described in either of their modes. The change from one type and/or mode of operation to another may be accomplished by setting seven 2-position switches to appropriate positions as indicated by a table, or, if a matrix switch and some additional logic gates are provided, by setting a 6 position SPRT-selection switch and a 2 position mode selector switch.

Obviously many modifications and variations of the present invention are possible in light of the above teachings. It is therefore to be understood that within the scope of the appended claims the invention may be practiced otherwise than as specifically described.

What is claimed and desired to be secured by letters patent of the United States is:

1. A single-look, unlimited-reply sequential probability ratio test device SLUR-SPRT for use in a Friend Identification system, said Friend Identification system having the following inputs available to said SLUR-SPRT device: $T_C$ - upper threshold number, $T_B$ - lower threshold number, $R_O$ - a-priori probability ratio, p(a/f) - probability that an acceptable reply will be received in response to any particular interrogation selected at random from those sent to a friend, $p(a/\bar{f})$ probability that an acceptable reply will be received in response to any particular interrogation selected at random from those sent to an enemy, LE-leading edge pulse, TE-trailing edge pulse, (a)-acceptable reply pulse, $(\bar{a})$ - unacceptable reply pulse, M-interrogation trigger pulses, K-a number equal to or slightly greater than the average number of missed replies required by a trailing edge detector to produce a trailing edge declaration, comprising:

threshold register means for receiving, storing, and providing as outputs said upper threshold number $T_C$ and said lower threshold number $T_B$;

ratio product determiner means receiving said inputs $R_O$, p(a/f), $p(a/\bar{f})$, LE, TE, (a), $(\bar{a})$ for producing a ratio product $R_n$ after each said reply has been evaluated and providing $R_n$ as an output, and additionally providing a delayed reset signal as an output;

comparator means for receiving and comparing said ratio product $R_n$ and said inputs $T_B$ and $T_C$ from said threshold register to determine if $R_n$ is greater than or equal to $T_C$, less than or equal to $T_B$ or between $T_C$ and $T_B$ and provide an indication of said determination as an output;

SLUR output selector means receiving said input K, said output of said comparator means, said M input and said delayed reset signal from said ratio product determiner means, for selecting for Mode 1 operation: an output of accept A, reject R, or unknown U; or for Mode 2 operation: an output of accept A, or not acceptable $\bar{A}$; and for either mode of operation, a reset bus pulse to be sent back to said ratio product determiner.

2. A single-look, limited reply sequential probability ratio test device SLLR-SPRT for use in a Friend Identification system, said friend identification system having the following inputs available to said SLUR-SPRT device: $T_C$-upper threshold, $T_{B,n}$ — multiple lower threshold numbers, $R_O$ — a-priori probability ratio, p(a/f) — probability that an acceptable reply will be received in response to any particular interrogation selected at random from those sent to a friend, $p(a/\bar{f})$ — probability that an acceptable reply will be received in response to any particular interrogation selected at random from those sent to an enemy, LE-leading edge pulse, TE-trailing edge pulse, (a)-acceptable reply pulse, $(\bar{a})$-unacceptable reply pulse, M-interrogation trigger pulses, K-a number equal to or slightly greater than the average number of missed replies required by a trailing-edge detector to produce a trailing edge declaration; N-the maximum number of replies to be evaluated during the look, comprising:

limited-reply threshold register means for receiving, storing and providing as outputs said upper threshold number $T_C$ and said multiple lower threshold numbers $T_{B,n}$;

ratio product determiner means receiving said inputs $R_O$, p(a/f), $p(a/\bar{f})$, LE, TE, (a), $(\bar{a})$, for producing a ratio product $R_n$ after each said reply has been evaluated, for additionally providing an output indicative that said LE input has been received, and a delayed reset signal as an output;

comparator means for receiving and comparing said ratio product $R_n$ and said inputs $T_C$ and $T_{B,n}$ to determine if $R_n$ is greater than or equal to $T_C$, less than or equal to $T_{B,n}$, or between $T_C$ and $T_{B,n}$ and provide an indication of said determination;

reply limiter means receiving said inputs M, N, an output from said ratio product determiner means which indicates that said LE signal has been received by said ratio product determiner and said delayed reset signal from said ratio product determiner, for producing an output indicating when N replies have been evaluated, for producing an output to said limited threshold register means to initiate the output of one of said lower threshold numbers, and for providing as an output said input M;

SLLR output selector means receiving said input K, said output of said comparator means, said delayed output from said OR circuit of said ratio product determiner means, said M input and said indication that N replies have been evaluated from said reply limiter, for selecting and producing for a Mode 1 operation: an output of accept A, reject R, or unknown U; or for a Mode 2 operation: an output of accept A or not acceptable $\bar{A}$; and for either mode of operation: a reset bus pulse to be sent back to said ratio product determiner.

3. An unlimited-look, unlimited-reply sequential probability ratio test device (ULUR-SPRT) for use in a Friend Identification system, said friend identification system having the following inputs available to said ULUR-SPRT device: $T_C$-upper threshold number, $T_B$—lower threshold number, $R_{O,j}$— a-priori probability ratio, p(a/f)— probability that an acceptable reply will be received in response to any particular interrogation selected at random from those sent to a friend, $p(a/\bar{f})$ probability that an acceptable reply will be received in response to any particular interrogation selected at random from those sent to an enemy, LE-leading edge pulse, TE-trailing edge pulse, (a)-acceptable reply pulse, $(\bar{a})$-unacceptable reply pulse, M-interrogation trigger pulse, K-a number equal to or slightly greater than the average number of missed replies required by a trailing-edge detector to product a trailing edge declaration, comprising:

threshold register means for receiving, storing, and providing as outputs said upper threshold number $T_C$ and said lower threshold number $T_B$;

ratio product determiner means receiving said inputs $R_{O,j}$, p(a/f), $p(a/\bar{f})$, LE, TE, (a), $(\bar{a})$ for producing a ratio product $R_{n,j}$ after each reply has been evaluated and providing $R_{n,j}$ as an output, and additionally providing one delayed and one undelayed reset signal as outputs;

comparator means for receiving and comparing said ratio product $R_{n,j}$ and said inputs $T_B$ and $T_C$ from said threshold register to determine if $R_{n,j}$ is greater than or equal to $T_C$, less than or equal to $T_B$, or between $T_C$ and $T_B$ and provide an indication of said determination as an output;

false droop eliminator means receiving said delayed and undelayed reset signal outputs and said $R_{n,j}$ output from said ratio product determiner, and said K input for providing as an output a ratio product $R_{n-k,j}$ produced K reply evaluations earlier; and ULUR output selector means receiving said M input, said K input, said ratio product $R_{n-k,j}$ from said false droop eliminator, said delayed reset signal output from said ratio product determiner, and said output of said comparator for selecting for Mode 1 operation: an output of accept A, reject R, or unknown U and an output of said ratio product $R_{n-k,j}$ whenever the selected output is U, and in addition providing a reset pulse to said ratio product determiner each time an output A, R, or U is selected, or for Mode 2 operation: an output of accept A or not acceptable $\bar{A}$, and said ratio product $R_{n-k,j}$ whenever the selected output is $\bar{A}$, and in addition providing a reset pulse to said ratio product determiner each time an output A or $\bar{A}$ is selected.

4. An unlimited-look, limited-reply sequential probability ratio test device (ULLR-SPRT) for use in a Friend Identification system, said friend identification system having the following inputs available to said ULLR-SPRT device: $T_C$—upper threshold number, $T_{B,n}$— multiple lower threshold numbers, $R_{O,j}$—a-priori probability ratio, p(a/f)—probability that an acceptable reply will be received in response to any particular interrogation selected at random from those sent to a friend, $p(a/\bar{f})$- probability that an acceptable reply will be received in response to any particular interrogation selected at random from those sent to an enemy, LE-leading edge pulse, TE-trailing edge pulse, (a)-acceptable reply pulse, $(\bar{a})$-unacceptable reply pulse, M-interrogation trigger pulses, K-a number equal to or slightly greater than the average number of missed replies required by a trailing edge detector to produce a trailing edge declaration, N-the maximum number of replies to be evaluated during the look, comprising:

limited-reply threshold register means for receiving, storing and providing as outputs said upper threshold number $T_C$ and said multiple lower threshold numbers $T_{B,n}$;

ratio product determiner means receiving said inputs $R_{O,j}$, p(a/f), $p(a/\bar{f})$, LE, TE, (a), $(\bar{a})$, for producing a ratio product $R_{n,j}$ after each reply has been evaluated for providing one delayed reset signal and one undelayed reset signal as outputs and additionally for providing as an output as indication that said input LE has been received;

comparator means for receiving and comparing said ratio product $R_{n,j}$ and said inputs $T_C$ and $T_{B,n}$ to determine if $R_{n,j}$ is greater than or equal to $T_C$, less than or equal to $T_{B,n}$ or between $T_C$ and $T_{B,n}$ and provide as an output an indication of said determination;

reply limiter means receiving said inputs M,N, said delayed reset signal output from said ratio product determiner, and said output from said ratio product determiner indicating that the LE pulse has been received by said ratio product determiner, for producing an output indicating when N replies have been evaluated, and for producing an output to said limited threshold register means to initiate the output of one of said lower threshold members $T_{B,n}$ and for providing as an output said input M;

false droop eliminator means receiving said delayed and undelayed reset signal outputs from said ratio product determiner, said $R_{n,j}$ output from said ratio product determiner, and said K input, for providing as an output a ratio product $R_{n-k,j}$ produced K reply evaluations earlier;

ULLR output selector means receiving said K input, said ratio product $R_{n-k,j}$ from said false droop eliminator, said delayed reset signal output from said ratio product determiner, said output of said comparator means, said output from said reply limiter indicating that N replies have been evaluated and said input M for selecting for a Mode 1 operation: an output of accept A, reject R, or unknown U; and said ratio product $R_{n-k,j}$ whenever the selected output is U, and in addition providing a reset bus pulse to said ratio product determiner each time an output A, R, or U is selected, or for Mode 2 operation: an output of accept A or not acceptable $\bar{A}$ and said ratio product $R_{n-k,j}$ whenever the selected output is $\bar{A}$, and in addition providing a reset bus pulse to said ratio product determiner each time an output A or $\bar{A}$ is selected, and also in either mode of operation said K input to false droop eliminator.

5. A limited-look, unlimited-reply sequential probability ratio test device (LLUR-SPRT) for use in a Friend Identification system, said friend identification system having the following inputs available to said LLUR-SPRT device. $T_C$-upper, threshold number, $T_B$-lower threshold number, $R_{O,j}$-a-priori probability ratio, p(a/f)-probability that an acceptable reply will be received in response to any particular interrogation selected at random from those sent to a friend, $p(a/\bar{f})$- probability that an acceptable reply will be received in response to any particular interrogation selected at random from those sent to an enemy, LE-leading edge pulse, TE-trailing edge pulse, (a)-acceptable reply pulse, $(\bar{a})$- unacceptable reply pulse, M-interrogation trigger pulses, K-a number equal to or slightly required by a trailing edge detector to produce a trailing edge declaration, greater than the average number of missed replies, L-maximum number of looks, T-a pulse each time a look at an unknown starts, comprising:

threshold register means for receiving, storing, and providing as outputs said upper threshold number $T_C$ and said lower threshold number $T_B$;

ratio product determiner means receiving said inputs $R_{O,j}$, p(a/f), $p(a/\bar{f})$, Le, Te, (a), $(\bar{a})$ for producing a ratio product $R_{n,j}$ after each reply has been evaluated and providing $R_{n,j}$ as an output for providing one delayed reset signal and one undelayed reset signal as outputs for providing as an output said input $R_{O,j}$;

comparator means for receiving and comparing said ratio product $R_{n,j}$ and said inputs $T_C$ and $T_B$ to determine if $R_{n,j}$ is greater than or equal to $T_C$, less than or equal to $T_B$ or between $T_C$ and $T_B$ and provide as an output an indication of said determination;

false droop eliminator means receiving said delayed and undelayed reset signal outputs from said ratio product determiner, said $R_{n,j}$ output from said ratio product determiner, and said K input for providing as an output ratio product $R_{n-k,j}$, produced K reply evaluations earlier;

output ratio determiner means receiving said input $R_{O,j}$ from said ratio product determiner means and said ratio product $R_{n-k,j}$ from said false droop eliminator, for comparing $R_{O,j}$ and $R_{n-k,j}$ and providing the largest as an output;

look limiter means receiving said T input and said L input, for providing as an output a determination that a maximum number of looks L have occurred;

LLUR output selector means receiving said K input, said output of said output ratio determiner, said output from said comparator means, said input M, said delayed reset signal output from said ratio product determiner, for selecting for a Mode 1 operation: an output of accept A, reject R, or unknown U and said ratio product $R_{n-k,j}$, whenever after L−1 or fewer looks, the selected output is U, and in addition providing a reset bus pulse to said ratio product determiner each time an outpur A, R, or U is selected, or for Mode 2 operation: an output of accept A or not acceptable $\bar{A}$ and said ratio product $R_{n-k,j}$ whenever, after L−1 or fewer looks, the selected output is $\bar{A}$, and in addition providing a reset bus pulse to said ratio product determiner each time an output A or $\bar{A}$ is selected, and also providing in either mode of operation said K input to false droop eliminator.

6. A limited-look, limited-reply sequential probability ratio test device LLLR-SPRT for use in a Friend Identification system, said friend identification system having the following inputs available to said LLLR-SPRT device: $T_C$-upper threshold number, $T_{B,n}$-lower threshold number, $R_{O,j}$-a-priori probability ratio, p(a/f)-probability that an acceptable reply will be received in response to any particular interrogation selected at random from those sent to a friend, p(a/f)-probability that an acceptable reply will be received in response to any particular interrogation selected at random from those sent to an enemy, LE-leading edge pulse, TE-trailing edge pulse, (a)-acceptable reply pulse, (ā)-unacceptable reply pulse, M-interrogation trigger pulses, K-a number equal to or slightly greater than the average number of missed replies required by a trailing edge detector to produce a trailing edge declaration, L-maximum number of looks, T-a pulse each time a look at an unknown starts, N-the maximum number of replies to be evaluated during the look, comprising:

limited-reply threshold register means for receiving, storing, and providing as outputs said upper threshold number $T_C$, and multiple lower threshold numbers $T_{B,n}$;

ratio product determiner means receiving said inputs $R_{O,j}$; p(a/f), p(a/f̄), LE, TE, (a), (ā), for producing a ratio product $R_{n,j}$ after each reply has been evaluated, for providing one delayed reset signal and one undelayed reset signal as outputs, providing as as output said input $R_{O,j}$, and for providing as an output an indication that said input LE has been received;

comparator means for receiving and comparing said ratio product $R_{n,j}$ and said inputs $T_C$ and $T_{B,n}$ to determine if $R_{n,j}$ is greater than or equal to $T_C$, less than or equal to $T_{B,n}$ or between $T_C$ and $T_{B,n}$ and provide as an output an indication of said determination;

false droop eliminator means receiving said delayed and undelayed reset signal outputs from said ratio product determiner, said $R_{n,j}$ output from said ratio product determiner, and said K input, for providing as an output a ratio product $R_{n-k,j}$ produced K reply evaluations earlier;

output ratio determiner means receiving said input $R_{O,j}$ from said ratio product determiner means and said ratio product $R_{n-k,j}$ from said false droop eliminator, for comparing $R_{O,j}$ and $R_{n-k,j}$ and providing the largest as an output;

reply limiter means receiving said inputs M, N, said delayed reset signal output from said ratio product determiner, and said output from said ratio product determiner indicating that the LE input has been received by said ratio product determiner, for producing an output indicating when N replies have been evaluated and for producing an output to said limited threshold register means to initiate the output of one of said multiple lower threshold number $T_{B,n}$, and for producing as an output said input M;

look limiter means receiving said T input and said L input for providing as an input a determination that a maximum number of looks L have occurred;

LLLR output selector means receiving said K input, said output of said output ratio determiner, said delayed reset signal output from said ratio product determiner, said output from said comparator means, said output from said reply limiter indicating that N replies have been evaluated, said output M from said reply limiter and said output from said look limiter, for selecting for Mode 1 operation, on the first L−1 looks, an output of accept A, reject R, or unknown U, and said ratio product $R_{n-k,j}$ whenever the selected output is U, and for Mode 1 operation on the $L^{th}$ look an output of accept A, reject R, or $L^{th}$-look unknown $U_L$, or for Mode 2 on the first L−1 looks an output of accept A or not acceptable $\bar{A}$ and said ratio product $R_{n-k,j}$ whenever the selected output is $\bar{A}$, and producing for Mode 2 on the $L^{th}$ look an output accept A or $L^{th}$ − look not acceptable $\bar{A}_L$ and in addition on either mode of operation providing a reset bus pulse to said ratio product determiner each time an output decision A, R, U, $\bar{A}$, $U_L$ or $\bar{A}_L$ is selected and continuously providing said K input to said false droop eliminator.

7. A general purpose sequential probability ratio test device GP-SPRT for use in a Friend Identification system, said friend identification system having the following input available to said GP-SPRT device: $T_C$-upper threshold number, $T_{B,n}$-lower threshold number, $R_{O,j}$—a-priori probability ratio, p(a/f)—probability that an acceptable reply will be received in response to any particular interrogation selected at random from those sent to a friend, p(a/f̄) probability that an acceptable reply, will be received in response to any particular interrogation selected at random from those sent to an enemy, LE-leading edge pulse, TE-trailing edge pulse, (a)— acceptable reply pulse, (ā) unacceptable reply pulse, M-interrogation trigger pulsed, K-a number equal to or slightly greater than the number of missed replies required by a trailing edge detector to produce a trailing edge declaration, L-maximum number of looks, T-a pulse each time a look at an unknown starts, N-the maximum number of replies to be evaluated during the look, comprising:

limited-reply threshold register means for receiving, storing and providing as outputs said upper threshold number $T_C$ and multiple lower threshold number $T_{B,n}$;

ratio product determiner means receiving said inputs $R_{O,j}$, p(a/f), p(a/f̄), LE, TE, (a), (ā) for producing a ratio product $R_{n,j}$ after each reply has been evaluated, for providing delayed and undelayed reset signals as outputs, for providing as an output said input $R_{O,j}$ and for providing as an output an indication that said input LE has been received;

first switch means for receiving said $R_{O,j}$ output of said ratio product determiner for providing $R_{O,j}$ as an output when said first switch is in one state and no output when said switch is in a second state;

comparator means for receiving and comparing said ratio product $R_{n,j}$ and said inputs $T_C$ and $T_{B,n}$ to determine if $R_{n,j}$ is greater than or equal to $T_C$, less than or equal to $T_{B,n}$ or between $T_C$ and $T_{B,n}$ and provide as an output an indication of said determination;

second switching means receiving the output from said comparator means when $R_{n,j}$ is less than $T_B$, for providing an output when said switch is in one state and no output when said switch is in a second state; false droop eliminator means receiving said delayed and undelayed reset signal outputs from said ratio product determiner, said $R_{n,j}$ output from said ratio product determiner and said K input for providing as an output a ratio product $R_{n-k,j}$ produced K reply evaluations earlier;

output ratio determiner means receiving said input $R_{O,j}$ from said first switch means and said ratio product $R_{n-k,j}$ from said false droop eliminator, for comparing $R_{O,j}$ and $R_{n-k,j}$ and providing the largest as an output;

reply limiter means receiving said inputs M, N, said delayed reset signal output from said ratio product determiner and said output from said ratio product determiner indicative that the LE input has been received by said ratio product determiner, for producing an output indicating that N replies have been evaluated and for producing an output to said limited threshold register means to initiate the output of one of said multiple lower threshold number $T_{B,n}$ and for producing as an output said input M;

third switching means receiving the output of said reply limiter means indicating that N replies have been evaluated for providing an output when said switch is in one state and no output when said switch is in a second state;

look limiter means receiving said T input and said L input for providing as an output a determination that a maximum number of looks L have occurred;

fourth switching means receiving the output of said look limiter for providing an output when said switch is in one state and no output when said switch is in a second state;

GP output selector means receiving said K input, said output of said output ratio determiner, said delayed reset signal output from said ratio product determiner, said output from said comparator means, said output from said second switching means, said output of said third switching means, said fourth switching means, said output M from said reply limiter, for selecting for Mode 1 operation a proper output of accept A, reject R, unknown U or for the $L^{th}$ look unknown $U_L$ and for Mode 2 operation a proper output of accept A, not acceptable $\overline{A}$ or for the $L^{th}$ look not acceptable $\overline{A}_L$, for providing reset outputs to said ratio product determiner and said look limiter, for providing said K input to said false droop eliminator, and providing said ratio product from said output ratio determiner as an output whenever the selected decision output is U or $A_L$, and providing as an output said input from said third switching means which is an indication of the $N^{th}$ reply evaluation;

a general purpose connector means receiving said outputs of said GP output selector means indicative of said reject R, not accept $\overline{A}$ and said unknown U, and said output indicative of the $n^{th}$ reply evaluation for selecting a proper output of reject R, not accept $\overline{A}$ and unknown U.

* * * * *